United States Patent [19]
Ishida et al.

[11] Patent Number: 6,067,373
[45] Date of Patent: May 23, 2000

[54] METHOD, SYSTEM AND COMPUTER READABLE MEDIUM FOR ITERATIVE IMAGE WARPING PRIOR TO TEMPORAL SUBTRACTION OF CHEST RADIOGRAPHS IN THE DETECTION OF INTERVAL CHANGES

[75] Inventors: Takayuki Ishida, Westmont; Shigehiko Katsuragawa, Chicago; Kunio Doi, Willowbrook, all of Ill.

[73] Assignee: Arch Development Corporation, Chicago, Ill.

[21] Appl. No.: 09/053,798

[22] Filed: Apr. 2, 1998

[51] Int. Cl.$^7$ ...................................................... G06K 9/80
[52] U.S. Cl. ......................... 382/130; 382/132; 382/294; 378/98.12
[58] Field of Search .................................... 382/130, 132, 382/293, 294, 295, 209, 217, 218, 215, 278; 128/922; 378/98.4, 98.12

[56] References Cited

U.S. PATENT DOCUMENTS

| | | | |
|---|---|---|---|
| 5,319,549 | 6/1994 | Katsuragawa et al. | 382/132 |
| 5,359,513 | 10/1994 | Kano et al. | 382/130 |
| 5,623,560 | 4/1997 | Nakajima et al. | 382/295 |
| 5,629,988 | 5/1997 | Burt et al. | 382/276 |

OTHER PUBLICATIONS

Mashfeghi. "Elastic Matching of Multimodality Medical Images." CVGIP, vol. 53, No. 3, pp. 271–282, May 1991.

*Primary Examiner*—Jon Chang
*Attorney, Agent, or Firm*—Oblon, Spivak, McClelland, Maier & Neustadt, P.C.

[57] ABSTRACT

A method of computerized analysis of temporally sequential digital images, including (a) determining first shift values between pixels of a first digital image and corresponding pixels of a second digital image; (b) warping the second digital image based on the first shift values to obtain a first warped image in which spatial locations of pixels are varied in relation to the first shift values; (c) determining second shift values between pixels of the first digital image and pixels of the first warped image; and (d) warping the first warped image based on the second shift values to obtain a second warped image in which spatial locations of pixels of the first warped image are varied in relation to the second shift values. Additional iterations of image warping are possible to enhance image registration between the first digital image and the warped version of the second digital image, followed by image subtraction of the first digital image and the final warped image to produce a difference image from which diagnosis of temporal changes ensues. Temporal subtraction assists radiologists in the detection of interval changes on chest radiographs, and particularly to overcome severe misregistration errors in the temporally sequential images mainly due to differences in a subject's inclination and/or rotation. In the production of shift values used in image warping, initial shift values are obtained by cross-correlation techniques using a template and search regions of interest. Shift vectors and a histogram of shift vectors in each lung are obtained from initial shift values. The histograms of shift vectors are used in the selection of sets of shift values for smoothing, using two-dimensional fitting and subsequent use of fitted shift values in image warping.

60 Claims, 18 Drawing Sheets

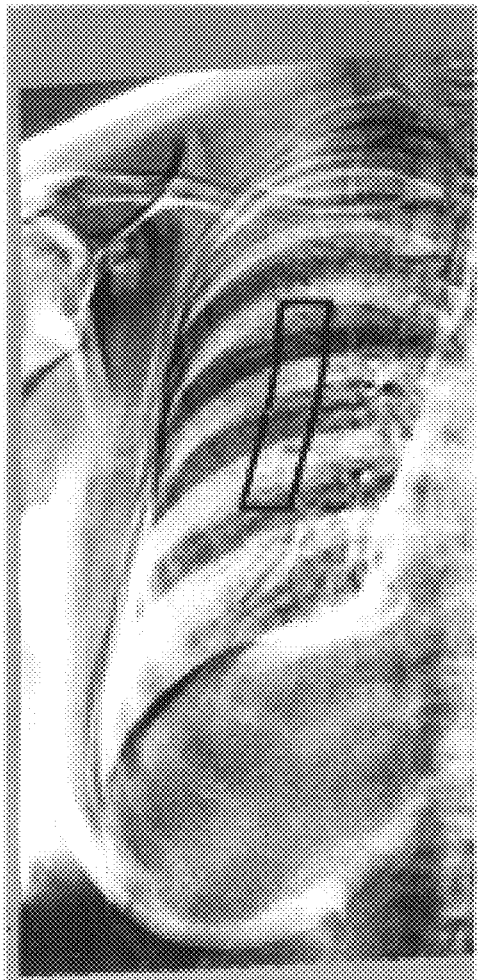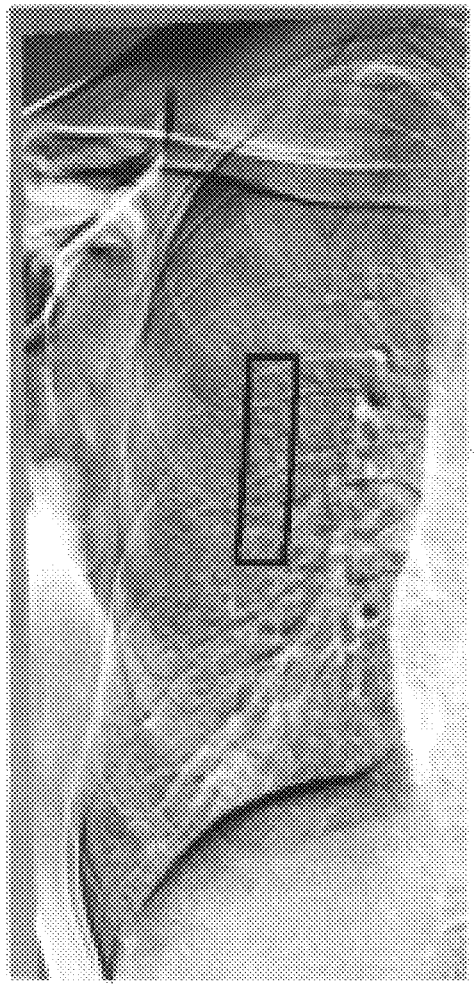
FIG.2A-1  FIG.2A-2

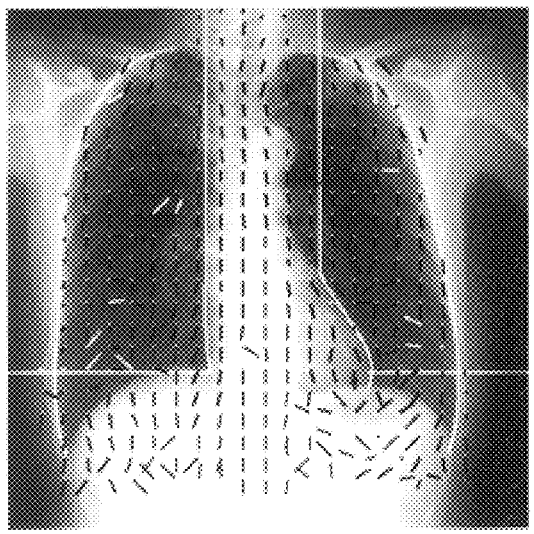 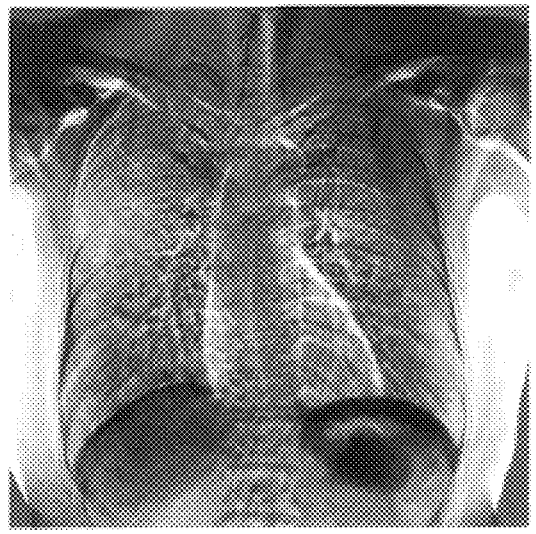
FIG.7A  FIG.7B
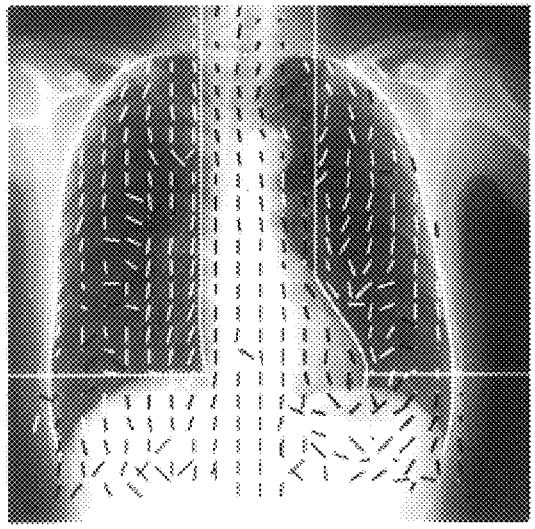 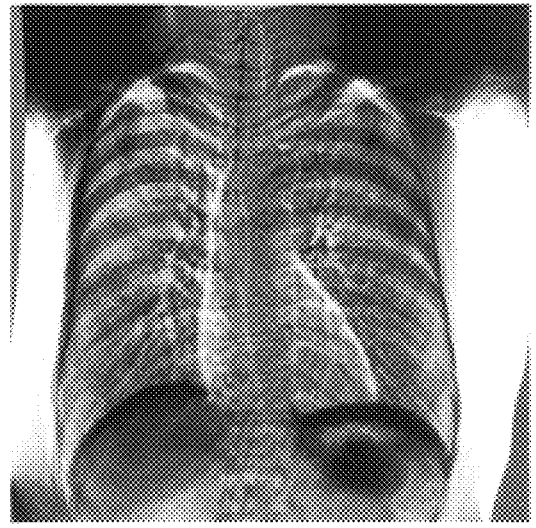
FIG.7C  FIG.7D

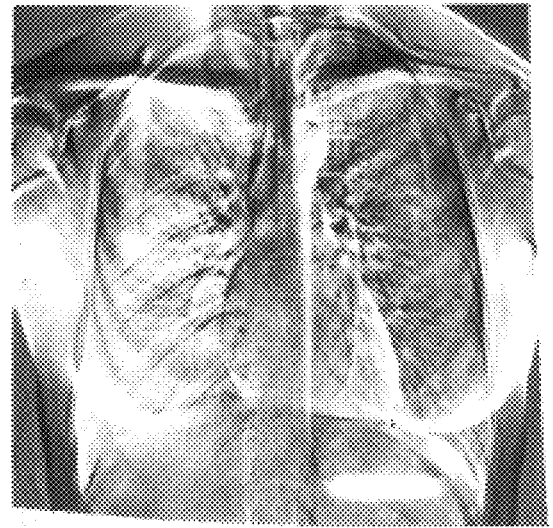
FIG.8A  FIG.8B
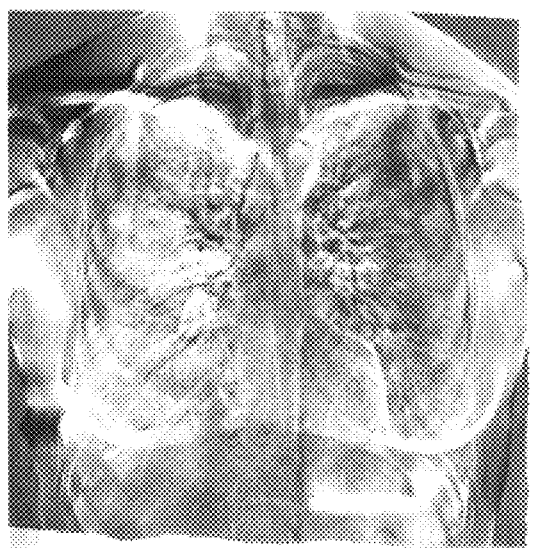
FIG.8C

METHOD, SYSTEM AND COMPUTER READABLE MEDIUM FOR ITERATIVE IMAGE WARPING PRIOR TO TEMPORAL SUBTRACTION OF CHEST RADIOGRAPHS IN THE DETECTION OF INTERVAL CHANGES

CROSS-REFERENCE TO RELATED APPLICATIONS AND PUBLICATIONS

The present is related to automated techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5.343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; as well as U.S. application Ser. No. 08/173,935 filed Dec. 28, 1993; Ser. No. 08/398,307 filed Mar. 3, 1995 abandoned; Ser. No. 08/523,210 filed Sep. 5, 1995 now U.S. Pat. No. 5,974,165; 08/562,087 filed Nov. 22, 1995; Ser. No. 08/757,611 filed Nov. 29, 1996 now U.S. Pat. No. 5,987,345; Ser. No. 08/900,188 filed Jul. 25, 1997; Ser. No. 08/900,189 filed Jul. 25, 1997; Ser. No. 08/900,191 filed Jul. 25, 1997; Ser. No. 08/900,192 filed Jul. 25, 1997 now U.S. Pat. No. 5,984,870; Ser. No. 08/900,361 filed Jul. 25, 1997; Ser. No. 08/900,362 filed Jul. 25, 1997 now U.S. Pat. No. 5,982,915; Ser. No. 08/979,623 filed Nov. 28, 1997; Ser. No. 08/979,639 filed Nov. 28, 1997; Ser. No. 08/982,282 filed Dec. 01, 1997; Ser. No. 09/028,518 filed Feb. 23, 1998; Ser. No. 09/027,685 filed Feb. 23, 1998, each of which are incorporated herein by reference in their entirety. Of these patents and applications, U.S. Pat. No. 5,319,549 and U.S. Pat. No. 5,982,915 are of particular interest.

The present invention also relates to technologies referenced and described in the references identified in the appended APPENDIX and cross-referenced throughout the specification by reference to the number, in brackets, of the respective reference listed in the APPENDIX, the entire contents of which are also incorporated herein by reference. Various of these publications may correspond to various of the cross-referenced patents and patent applications.

STATEMENT REGARDING FEDERALLY SPONSORED RESEARCH

The present invention was made in part with U.S. Government support under grant numbers CA 62625 and CA 64370 (National Institutes of Health). The U.S. Government has certain rights in the invention.

BACKGROUND OF THE INVENTION

1. Field of the Invention

The present invention is related to temporal analysis of medical images and, in particular, to the analysis of chest radiograph images using automated temporal subtraction.

2. Discussion of the Background

For the interpretation of chest radiographs, radiologists commonly compare a current film with previous films in order to facilitate the detection of abnormalities on chest radiographs, such as pulmonary nodules, interstitial infiltrates, pleural effusions, and cardiomegaly. However, it is a difficult task for radiologists to identify subtle interval changes on chest radiographs because lesions can overlap with anatomic structures such as ribs, vessels, heart, and diaphragm. In order to assist radiologists in their evaluation of temporal changes in chest radiographs, investigators at the University of Chicago Department of Radiology have developed a temporal subtraction scheme based on a non-linear geometric warping technique. [1] In this scheme, the subtle changes and/or newly developed abnormalities on chest radiographs were enhanced on the subtracted image. In fact, in an observer test, the detection accuracy of interval changes in chest radiographs was improved significantly by use of temporal subtraction images. [2] In a more recent study, the temporal subtraction scheme has been improved by an initial image matching technique which is based on the cross-correlation of a pair of blurred low-resolution images for determination of accurate global shift values. [3] However, misregistration errors caused by failure in local image matching were still observed in some cases.

SUMMARY OF THE INVENTION

It is an object of the present invention to provide improved automated temporal subtraction of images derived from chest radiographs.

Another object of this invention is to provide a novel image processing technique to overcome severe misregistration errors mainly due to differences in a subject's inclination and/or rotation in temporally sequential images.

A further object of this invention is to provide a novel temporal image subtraction technique to assist radiologists in the detection of interval changes on chest radiographs.

These and other objects are achieved according to the present invention by providing a novel method, system and computer readable medium for computerized analysis of temporally sequential digital images. The method includes the steps of (a) determining first shift values between pixels of a first digital image and corresponding pixels of a second digital image; (b) warping said second digital image based on the first shift values to obtain a warped image in which spatial locations of pixels are varied in relation to said first shift values: (c) determining second shift values between pixels of said first digital image and pixels of said warped image obtained in step (b); (d) warping said warped image obtained in step (b) based on the second shift values to obtain an iteratively warped image in which spatial locations of pixels of said warped image obtained in step (b) are varied in relation to said second shift values; and (e) subtracting the iteratively warped image from said first digital image. Additional iterations of image warping are possible to enhance image registration between the first digital image and the warped version of the second digital image, followed by image subtraction of the first digital image and the final warped image to produce a difference image from which diagnosis of temporal changes ensues. In the production of shift values used in image warping, initial shift values are obtained by cross-correlation techniques using a template and search regions of interest. Shift vectors and a histogram of shift vectors are obtained from each initial shift value. Based on the histogram of shift vectors, variations in various groups of the initial shift values are smoothed using two-dimensional fitting.

The present invention similarly includes a computer readable medium storing program instructions by which the method of the invention can be performed when the stored program instructions are appropriately loaded into a computer, and a system for implementing the method of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2(a)(A) and 2(a)(B) are photographs of subtraction images with ROI placement for analysis of histograms for pixel values, with the photograph of FIG. 2(a)(A) being an example of a poor subtraction image and the photograph of FIG. 2(a)(B) being an example of a good subtraction image.

FIGS. 7(a)–7(d) are photographs respectively illustrating (a) dominant shift vectors (dark lines) in a temporal image, (b) subtraction image; (c) remaining shift vectors (dark lines) and (d) a subtraction image.

FIGS. 8(a), 8(b) and 8(c) are photographs of subtraction images respectively obtained with (a) a single warping technique, (b) an iterative warping technique, and (c) an iterative warping technique plus linear interpolation of shift values.

DESCRIPTION OF THE PREFERRED EMBODIMENTS

Figure 1A:
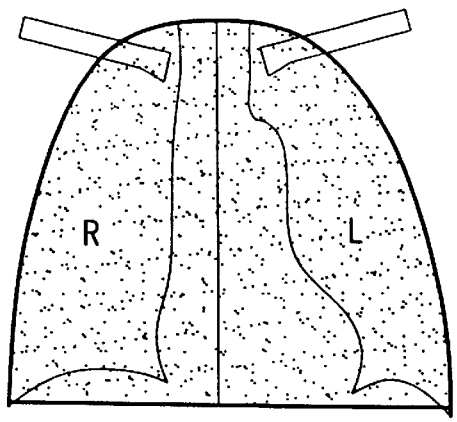
FIGS. 1(a), 1(b), 1(c) and 1(d) are illustrations illustrating the selection of different ROIs for analysis of histograms of subtraction images.

In the derivation of the present invention, 181 pairs of chest radiographs with the current temporal subtraction scheme were examined. Initial image matching technique as disclosed in U.S. Pat. No. 5,319,549 was employed. One hundred forty-two (78.5%) of 181 subtraction images showed adequate, good, or excellent quality. However, the remaining 39 (21.5%) cases were totally or partly misregistered, mainly due to A-P inclination and/or insufficient rotation correction. In order to reduce these misregistration errors. we developed a new temporal subtraction technique, as disclosed hereinafter, was developed by applying an iterative image warping technique.

Materials and Methods

Materials

The image database used in the derivation of the present invention included 181 pairs of chest radiographs obtained from the Iwate Prefectural Hospital, Morioka, Japan. These 181 cases were obtained sequentially from chest screening images which were made with a Fuji Computed Radiography (FCR) system (Fuji Medical Systems Co., Ltd., Tokyo, Japan). The time interval between the current and previous images for all cases was 1 year. The pixel size and gray level of CR chest images were 0.2 mm and 1024, respectively. The technique of the present invention was developed by use of a Silicon Graphics O2 workstation.

Methodology

1. Subjective Evaluation of the Quality of Subtraction Images

To evaluate the qualitv of subtraction images obtained with the previous and the new subtraction scheme, subjective ratings were obtained from two chest radiologists and two physicists independently. A five-point rating scale was employed, that is, 1. (very poor): most ribs were not registered and appear in the entire intercostal space, 2 (poor): most ribs were not well registered and appear in half of the intercostal space, 3 (adequate): most ribs were well registered with some minor misregistration error, 4 (good): most ribs were almost completely registered with very minor misregistrations partly, and 5 (excellent): all ribs were perfectly registered.

The final rating for each case was determined in one of the five categories above based on the average (or the majority) of all observers' ratings.

2. Objective Evaluation of the Quality of Subtraction Images

For objective evaluation of the quality of a subtraction image, we employed the width of the histogram of pixel values for the right and the left lung area of the subtraction image was employed. It was found that in the case of subtraction images without an actual interval change, a high-quality subtraction generally yields a low-contrast image, whereas the contrast of poor subtraction images tends to be high, because poor subtraction images partly contain localized mixtures of very dark and very light areas due to misregistration. Therefore, the histogram of pixel values in each lung field of the subtraction image was employed to evaluate the quality of subtraction images. [3]

Figure 1B:
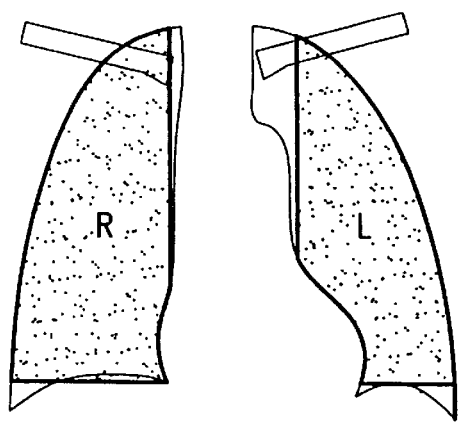
Figure 1C:
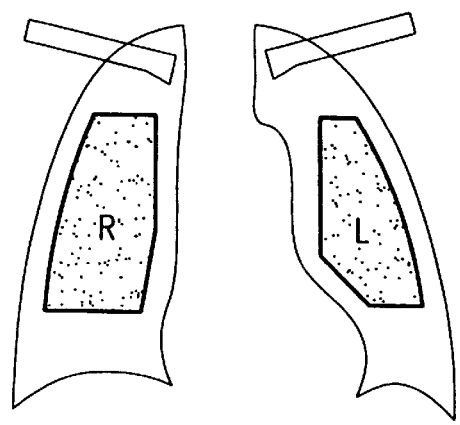
Figure 1D:
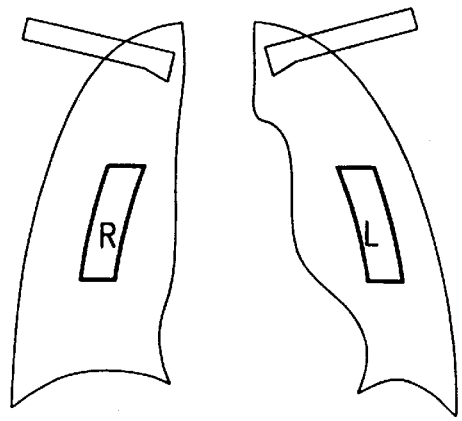

For determination of the histogram of pixel values in each lung field of the subtraction image, various ROIs of different size and shape in each lung were examined, as shown in FIGS. 1(a)–1(d). Initially, the ROI included all of the lung and mediastinum areas, as illustrated in FIG. 1(a). Second, we segmented the right and left lungs were segmented by using the heart border information, as shown in FIG. 1(b), in order to evaluate the quality of the subtraction image in each lung field separately. However, it was found that the top and the bottom areas of the ROIs tended to include misregistration errors caused by the difference between the clavicle positions, and also the difference between different diaphragm levels, respectively. Therefore, third, the areas around the ribcage edge boundaries and the boundaries of the mediastinum were excluded from the ROIs, as shown in FIG. 1(c). Finally. small ROIs as shown in FIG. 1(d) were employed because the extent of the misregistration error for the ribs can be detected more sensitively with the ROI placed over the central area of the lung rather than with the other ROIs shown in FIGS. 1(a), 1(b), and 1(c). The size of the small ROIs for both lungs was 30 pixels (width)×120 pixels (length). The centers of the ROIs were determined by using the x,y coordinates of the ribcage edges and the cardiac edges. The vertical locations of the two centers of the ROIs were the same and equal to the y-location between the top lung, which was obtained from the ribcage edge detection scheme. and the bottom of the right ribcage edge. The horizontal centers of the ROIs were determined as the x-location in each lung between the ribcage edge and the cardiac edge, at the vertical center level of the ROIs.

Figure 2B:
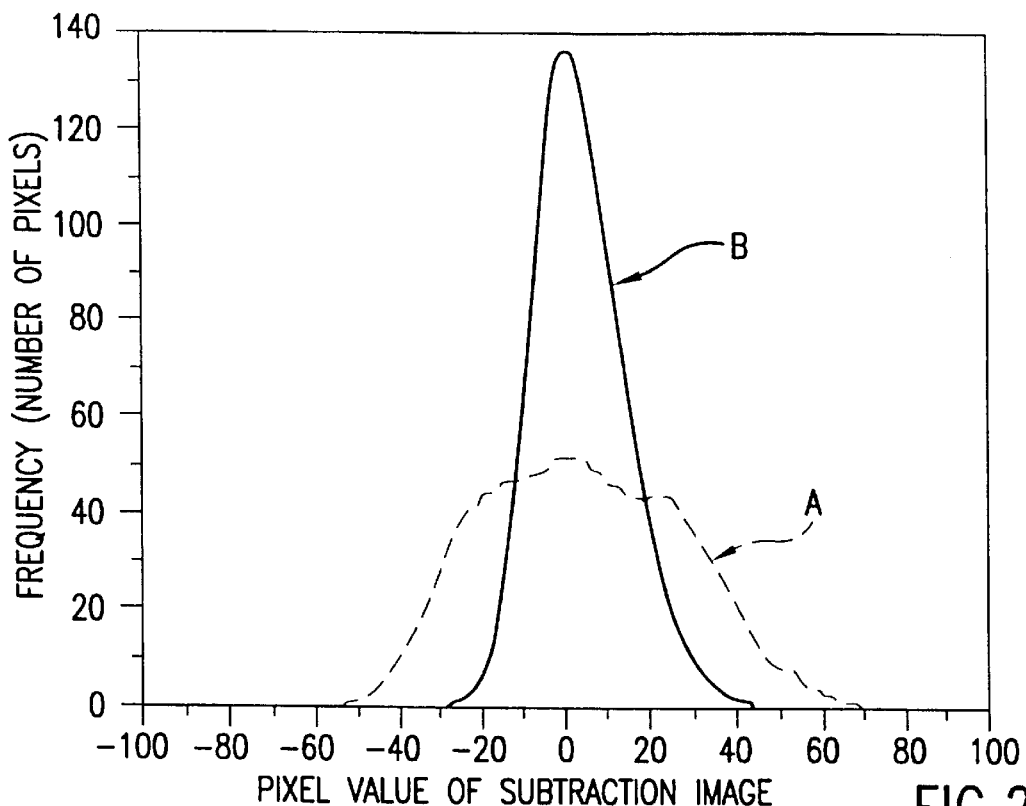
FIG. 2(b) is a graph of histograms of subtraction images of FIGS. 2(a)(A) and 2(a)(B).

FIG. 2(a) shows a comparison of a poor (A) and a good (B) subtraction images of the right lung. The ROIs used for determination of the histogram width are illustrated by black lines. The corresponding histograms of these images are shown in FIG. 2(b). It is seen that the width of the histogram for the poor subtraction image (A) is much wider than that for the good subtraction image (B). Although an actual interval change in chest images can broaden the histogram of the subtraction image, the "misregistration" (the difference between an abnormal current image and a normal previous image) due to the actual interval abnormal change would usually be localized and small compared with the misregistration errors due to a failure in image matching. Therefore, the quality of the subtraction image was evaluated by using the widths of the histograms in the ROI for each lung.

Figure 3A:
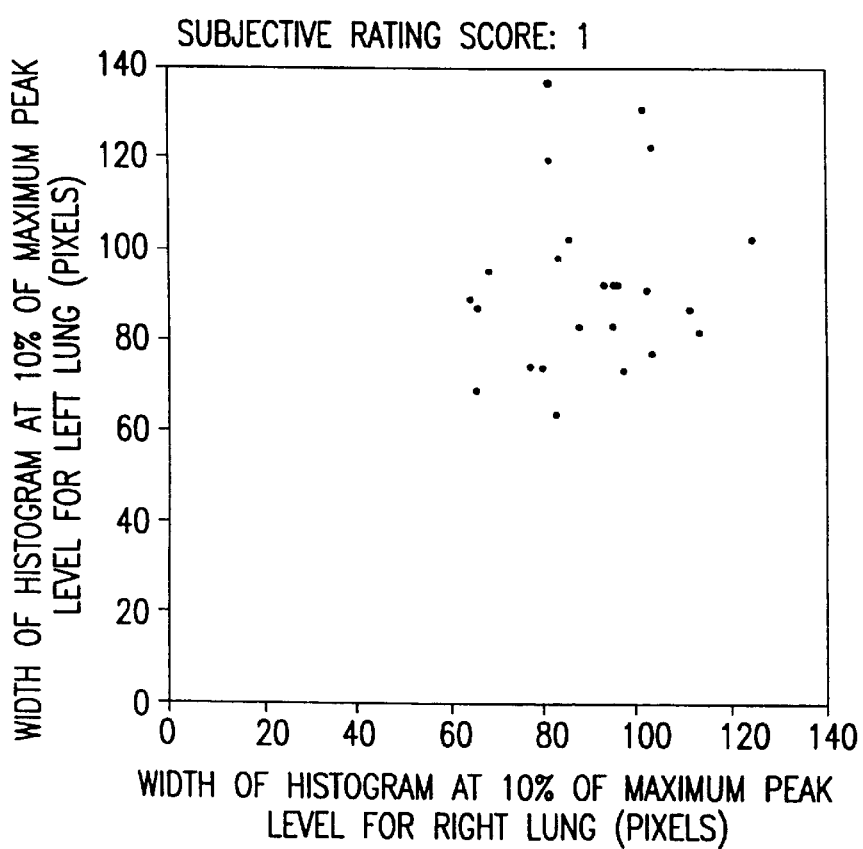
FIGS. 3(a)–3(e) are illustrations of distributions of histogram widths in both lungs for cases rated as (a) 1 (very poor quality), (b) 2 (poor quality), (c) 3 (adequate quality), (d) 4 (good quality), and (e) 5 (excellent quality), respectively.
Figure 3B:
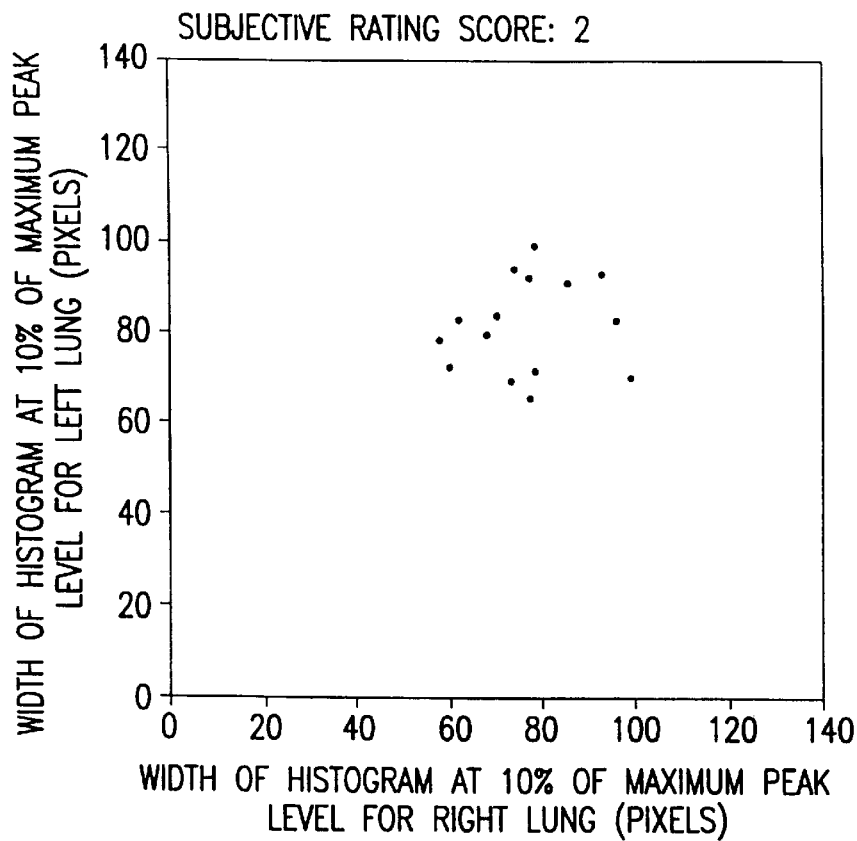
Figure 3C:
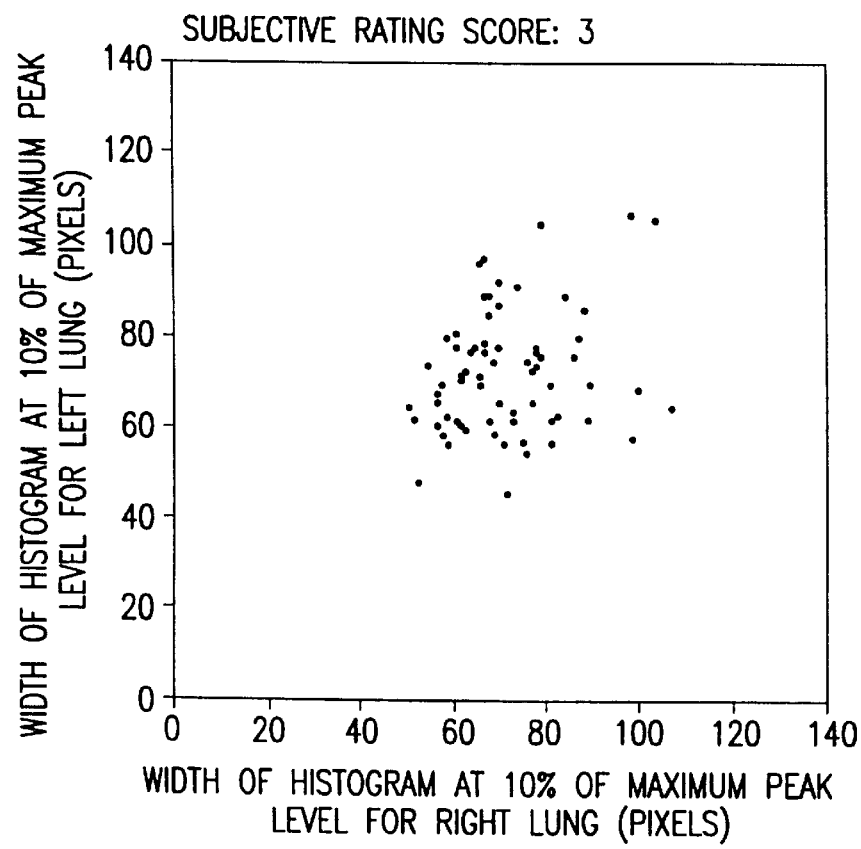
Figure 3D:
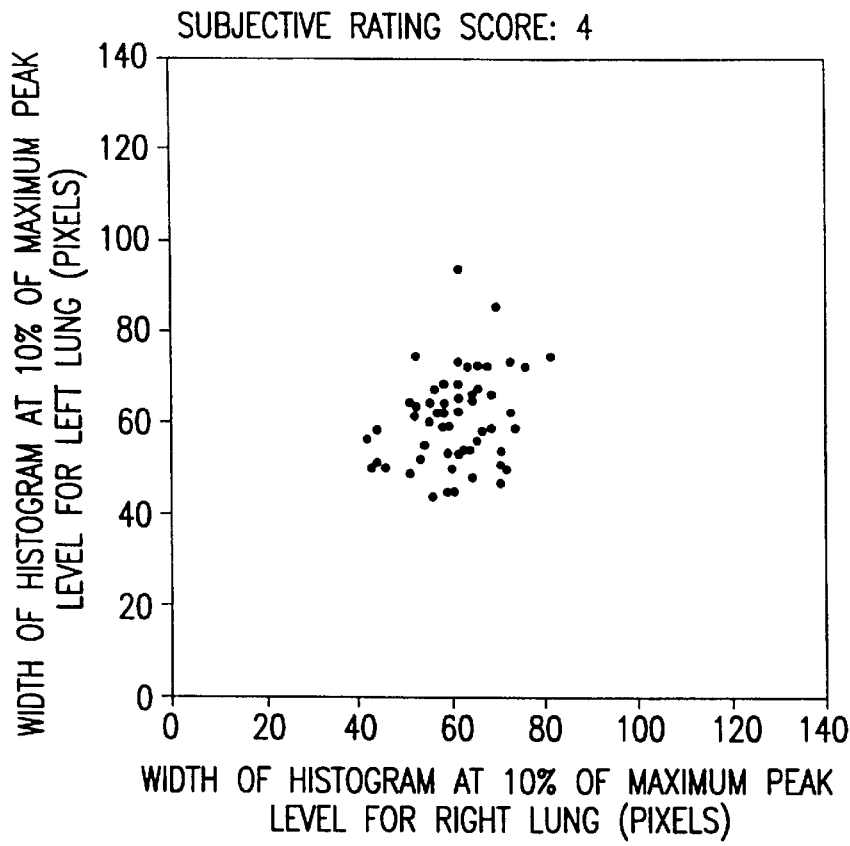
Figure 3E:
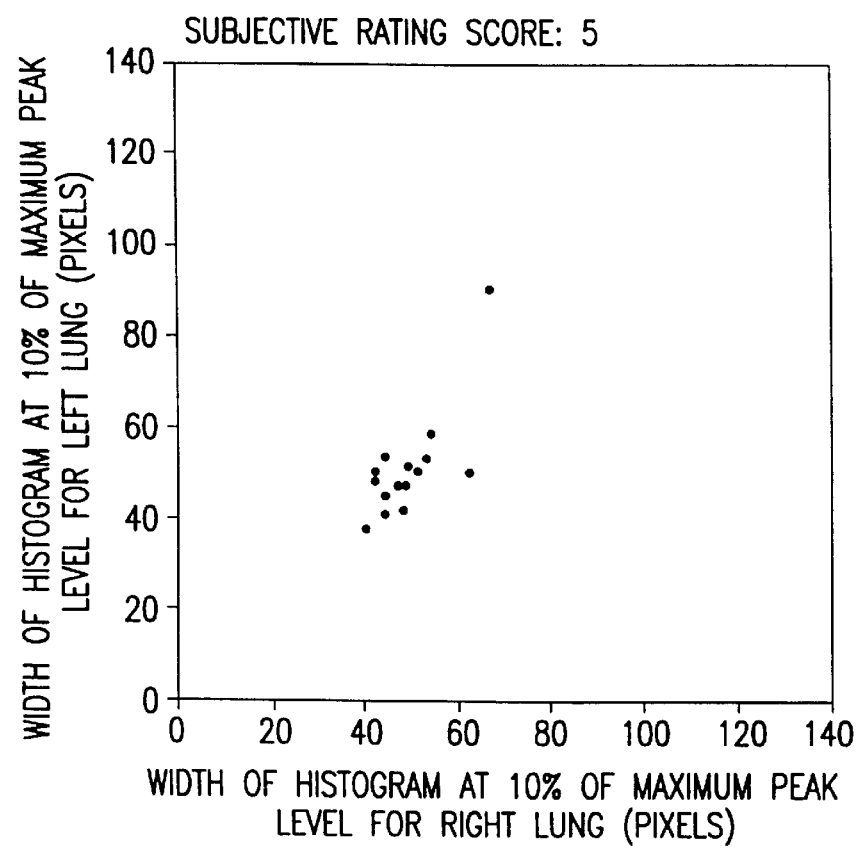

As a measure for evaluation of the quality of subtraction images, the width of the histogram at 10% of the largest peak was obtained. It was found that the width of the histogram at a low level such as 10% of the peak was more sensitive than the histogram width at a high level in distinguishing between good and poor subtraction images. The distributions of the histogram widths for each of the five groups of different qualities of subtraction images, which were grouped based on subjective ratings, obtained by the previous technique are shown in FIGS. 3(a)–3(e). In these figures, the horizontal and vertical axes correspond to the width of the histogram in the right and the left lung, respectively. The histogram widths for "very poor" and "poor" subtraction images (subjective rating scores: 1 and 2) tend to be large and are distributed in the upper right, as shown in FIGS. 3(a) and 3(b). The histogram widths of "adequate" subtraction images (subjective rating: 3) are distributed in the intermediate range, as shown in FIG. 3(c). The histogram widths for "good" subtraction images (subjective rating: 4) are shifted toward the lower left, as shown in FIG. 3(d). The "excellent" subtraction images as represented by a subjective rating score of 5 are characterized by narrow histogram widths, as shown in FIG. 3(e).

3. Overall Scheme of the New Temporal Subtraction Technique

In our previous temporal subtraction scheme, a nonlinear density correction technique [1,7] was applied first for adjustment of the density and contrast in the two digitized images, i.e., the current and previous chest radiographs. The difference in the lateral inclination between the two images was corrected by use of an image rotation technique. The global shift values were then determined for the initial registration by use of the cross-correlation of a pair of blurred low-resolution images obtained from the current and the previous image. [3] For local matching, a number of template ROIs (32×32 matrix) and the corresponding search area ROIs (64×64 matrix) were selected from the previous and the current image, respectively. The number of pairs of ROIs was approximately 300 per case. Shift values. $\Delta x$ and $\Delta y$, for all pairs of selected ROIs were determined by using a cross-correlation technique to find the "best" matched areas in the current and previous images. A two-dimensional surface fitting by use of polynomial functions was then applied to each set of mapped shift values, $\Delta x$ and $\Delta y$ for conversion of the x,y coordinates of the previous image, i.e., for warping of the image. The warped previous image was then subtracted from the current image. [1] These steps are preferably also employed in practice of the present invention.

Figure 4A:
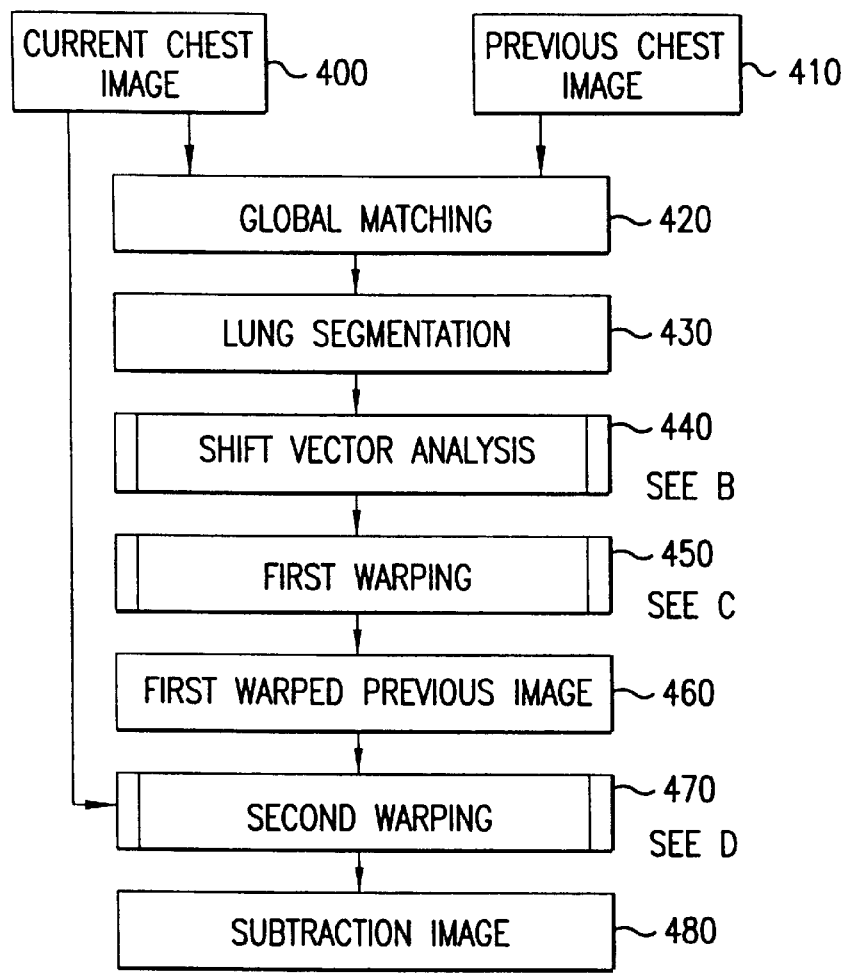
FIG. 4(a) is a schematic diagram of the temporal subtraction method using an iterative warping technique according to the present invention.

The temporal subtraction technique is illustrated in overview in FIG. 4(a). The matrix size for the current and the previous chest image obtained with a CR system is reduced to 586×586 (one third of the original image matrix size). In this study, a density correction technique was not applied because the chest images obtained with the CR system can maintain consistent density and contrast with the use of the exposure data recognition (EDR) system [4] included in most recent CR systems.

In order to correct for the lateral inclination caused by the variation in patient positioning between the current chest image 400 and the previous image 410 schematically shown in FIG. 4(a), global matching 420 is performed using an image rotation [2], determining the angle between the two images by comparison of the two midlines of these images [5], and applying an initial image matching technique for determination of the global shift value between the two images, which corresponds to the shift in the x,y coordinates of one image relative to the other. [3] The two images are globally registered by use of the initial image matching technique based on the cross-correlation of blurred low-resolution images.

In the method of the present invention, an iterative image warping technique is employed to improve local image matching and thus to reduce registration errors. To select the ROIs for the local image matching, local segmentation 430 is performed in which the ribcage edges of the previous image are detected based on image profile analysis. [5] In addition, the cardiac edges are determined based on an edge detection technique for segmentation of the lungs of the current image. [6] In step 440. the shift values $\Delta x$ and $\Delta y$, for all of the selected ROIs are determined by a cross-correlation technique. [1] Shift vectors based on the shift values $\Delta x$ and $\Delta y$ are then determined, as discussed in more detail hereinafter. A first image warping (step 450), typically of the previous or older image, is performed to derive a first warped image (step 460). Then a second warping (step 470) is performed on the first warped image, followed by obtaining of a subtraction image 480 for diagnosis.

Figure 4B:
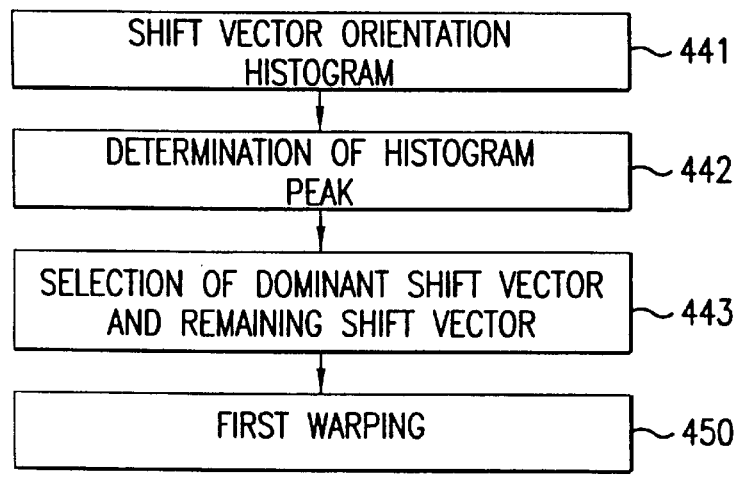
FIGS. 4(b)–4(d) are highly schematic diagrams of shift vector analysis, first warping, and second warping steps, respectively, included in the method of FIG. 4(a).

FIG. 4(b) illustrates very schematically one embodiment of determination of fitted shift values for the first warping step. First, once the initial values of shift values are obtained [1,3], a shift vector orientation histogram is obtained (step 441) for each lung. In step 442 peaks in the histogram of each lung are determined, and utilized to identify dominant and remaining shift vectors (step 443). After further processing to derive optimized shift values, a first warping is performed.

Figure 4C:
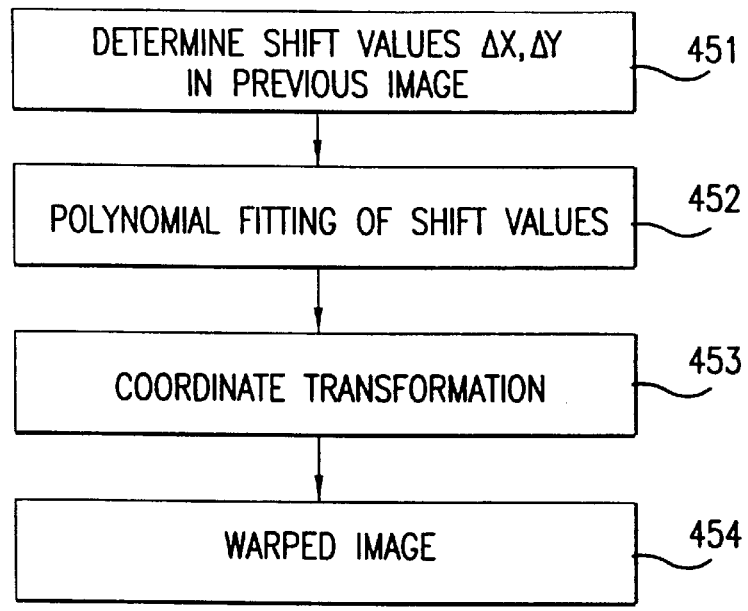
Figure 4D:
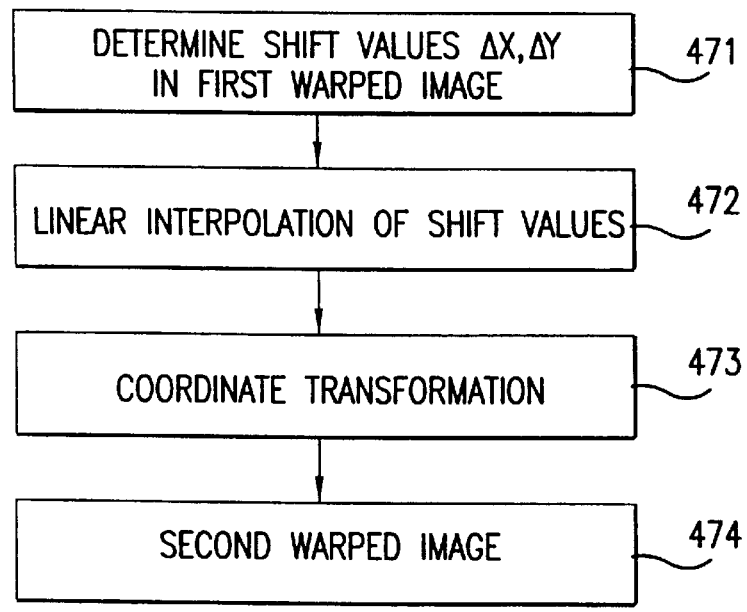

The steps for the first and the second image warping technique are very schematically shown in FIGS. 4(c) and 4(d), respectively. With the first image warping of step 450, in step 451 optimized shift values are determined and then in step 452 subjected to surface fitting [1]. After fitting, a coordinate transformation is performed in step 453 and a warped image obtained in step 454.

As shown in FIG. 4(d), a second image warping technique, which is applied to the warped previous image, is then performed. The optimized shift values between the current image and the warped previous image are determined by the cross-correlation technique and vectors are again determined in step 471 to derive optimized shift values, as discussed in more detail hereinafter. A linear interpolation is performed on the optimized shift values in step 472 to determine the final shift values on all of the x,y coordinates of the warped previous image. Another coordinate transformation is performed in step 473 to obtain a second warped image in step 474. Finally, the temporal subtraction image is obtained by subtraction of the second warped previous image from the current chest image, as shown schematically in step 480 of FIG. 4(a).

4. Weighting Factors for Surface Fitting of Shift Values

In the previous technique, weighting factors determined based on the cross-correlation values were used for surface fitting to determine the local shift values. [1] In general, the larger the cross-correlation value, the larger the weighting factor. However, it was found that the cross-correlation values near the ribcage borders, in the mediastinum area, and below the diaphragm area were generally very large, and much greater than the values in the lung areas. Therefore, the fitted shift values would have been affected considerably by the shift values near the ribcage borders, in the mediastinum, and below the diaphragms area. This is not desirable, because accurate subtraction is commonly required in the lung fields rather than in other areas in chest images. In order to avoid this problem, a lung segmentation method, which includes the detection of ribcage edges and heart edges for identifying the shift values in the lung area, is employed. A weighting factor of 1.0 is assigned for ROIs in the lung areas, and 0.25 for ROIs in the mediastinum and below the diaphragm, whereupon weighted polynomial fitting is performed. [1] In this way, the fitted shift values are determined for the first warping step. When the new weighting factors were used, the registration errors in the lung areas were reduced in some cases.

5. Shift-vector Orientation Analysis

The surface fitting technique of the shift values was generally effective in improving local registration around the poorly matched regions. [1] However, if some shift vectors with incorrect orientation are included within a relatively small region, the correct shift vectors may be affected significantly by the fitting. In the previous method [1.3], the orientation (or angle) of the shift vectors was not considered in the process for determining the surface fitting of the shift values. However, according to the present invention it has since been determined that the orientation of the shift vectors is an important factor for accurate surface fitting, and therefore two different components, i.e., the dominant and the remaining (non-dominant) shift vectors, are identified by using the shift vector orientation histogram, which is a histogram of accumulated shift values as a function of the shift vector orientation.

In the method of the present invention, first, the ribcage edges and the cardiac edges are determined by using the edge detection technique [6] for segmentation of the lungs. Many ROIs are selected in the lung field for both the previous and current images. Shift values, $\Delta x$ and $\Delta y$, are determined for each pair of ROIs based on the cross-correlation technique. [1] The orientation (or angle) of the shift vector for each ROI is determined by the arc tangent of $\Delta y/\Delta x$. Then the shift-vector orientation histograms for the right and the left lung are obtained.

Figure 5A:
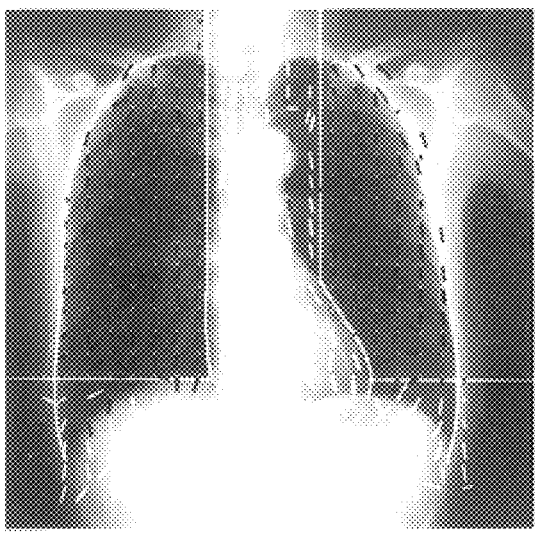
FIGS. 5(a) and 5(b) are photographs of respective subtraction images obtained using different shift vectors, i.e., (a) good subtraction image and (b) a poor subtraction image, wherein shift vectors are overlaid on each image, dark and light vectors (short lines) are used for inside and outside, respectively, of approximate lung areas, and small white dots at one end of dark vectors indicate initial locations of template ROIs, which are used in the warping technique
Figure 5B:
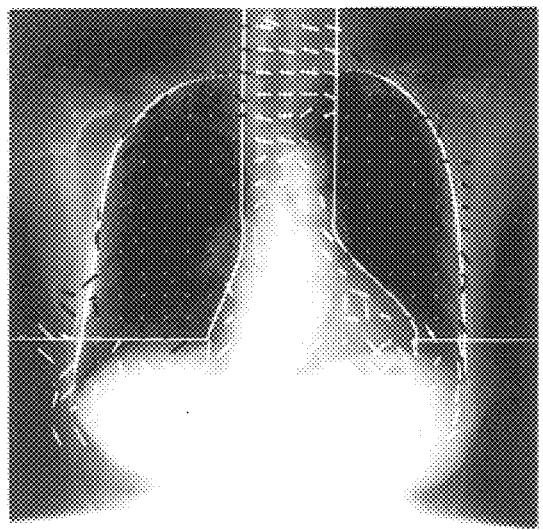
Figure 6A:
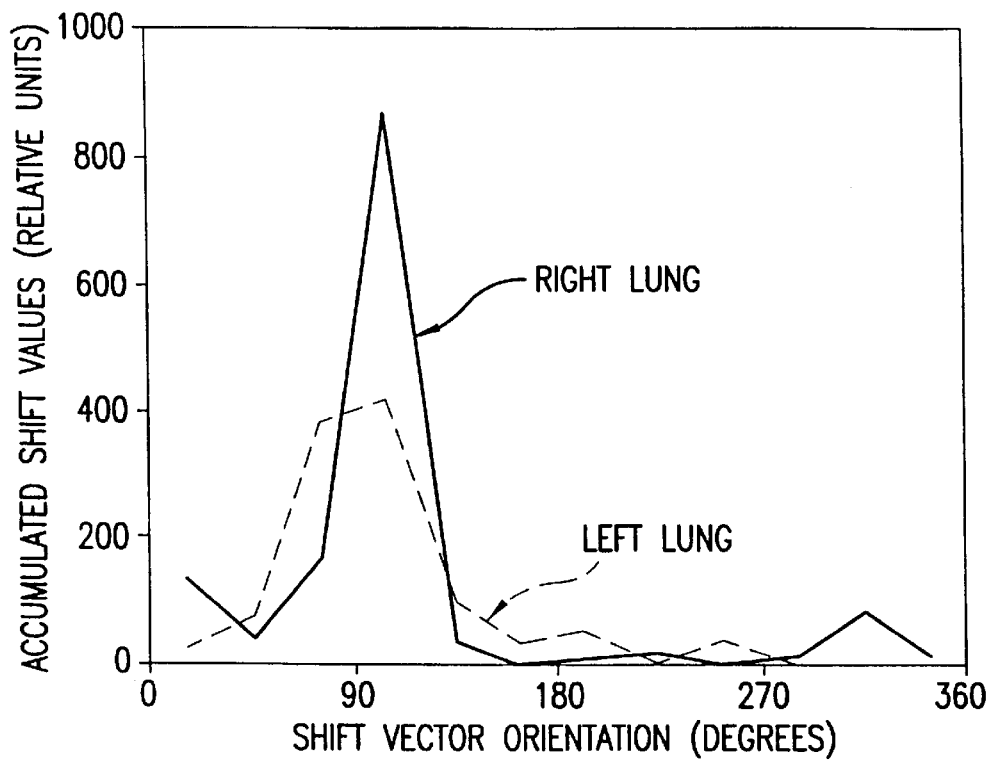
FIGS. 6(a) and 6(b) are graphs respectively illustrating a distribution of accumulated shift vector values as a function of shift vector orientation for (a) a good subtraction case and (b) a poor subtraction case.
Figure 6B:
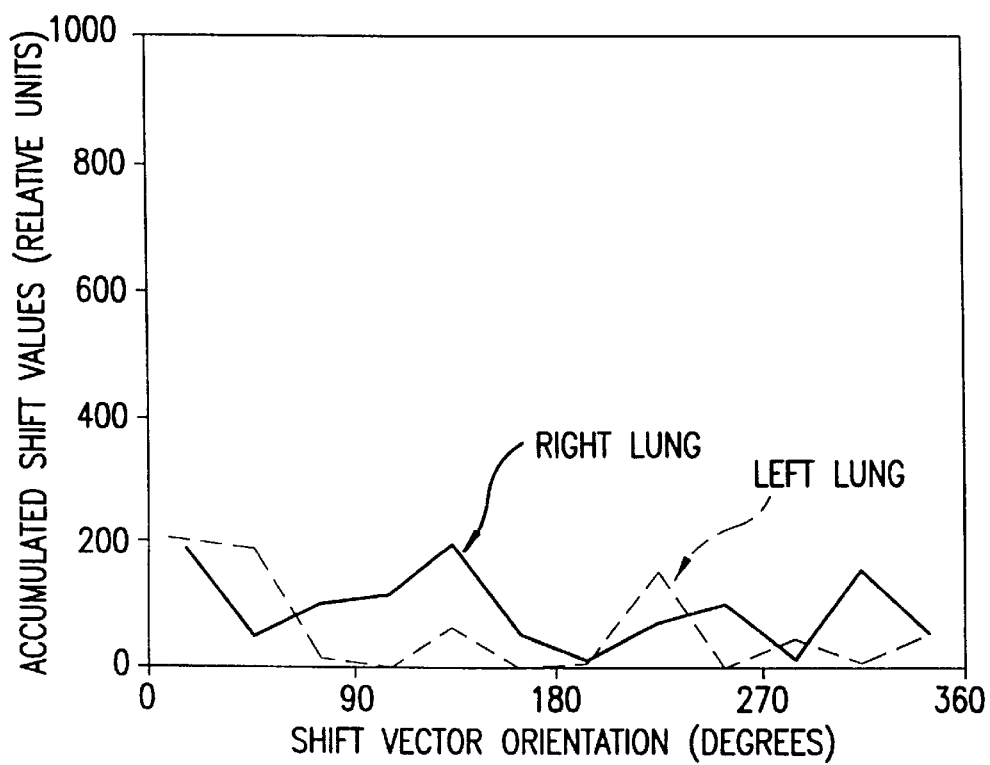
Figure 9A:
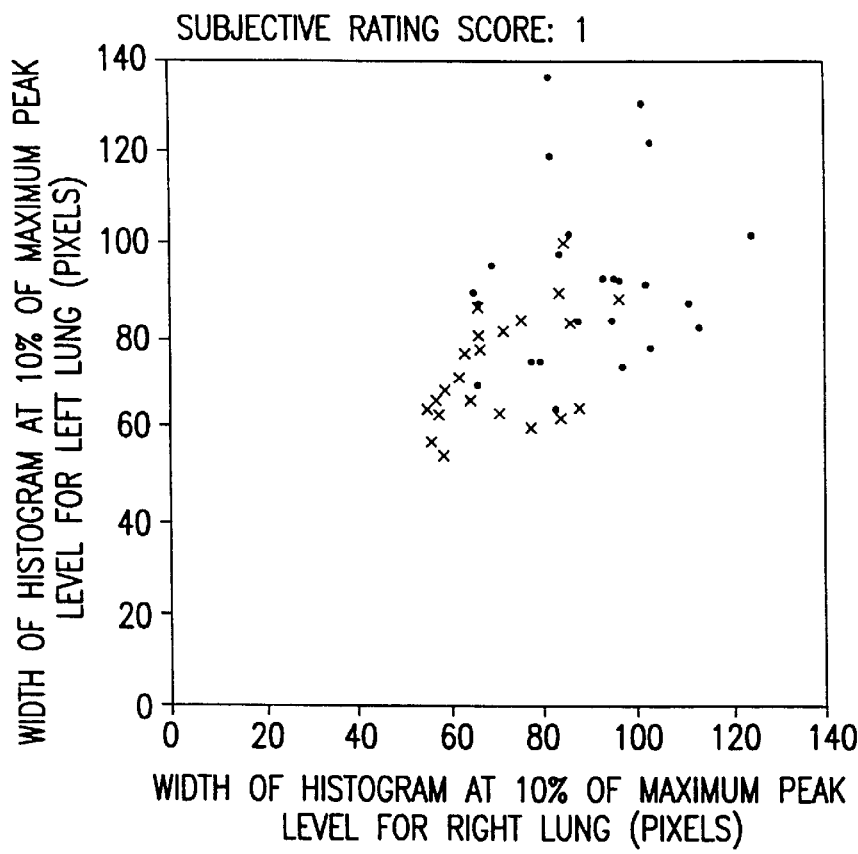
FIGS. 9(a), 9(b), 9(c), 9(d), and 9(e) are graphs respectively illustrating distributions of histogram widths in both lungs for the 181 cases, obtained with the prior warping technique (dots) and the warping technique of the present invention (x), rated as 1 (very poor quality), 2 (poor quality), 3 (adequate quality), 4 (good quality), and 5 (excellent quality).
Figure 9B:
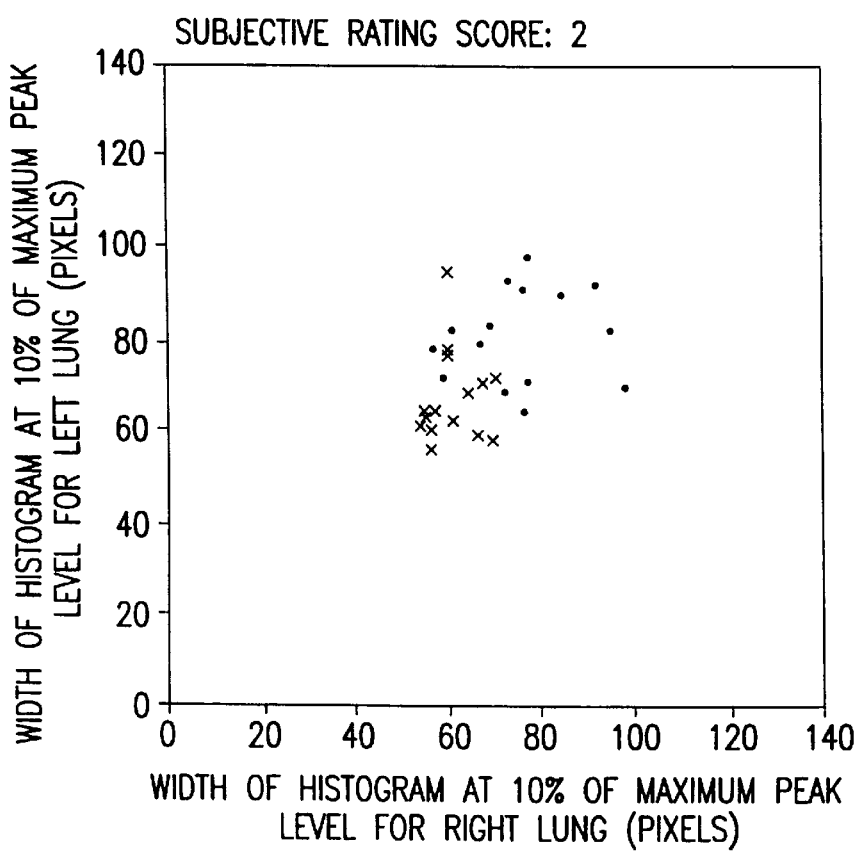
Figure 9C:
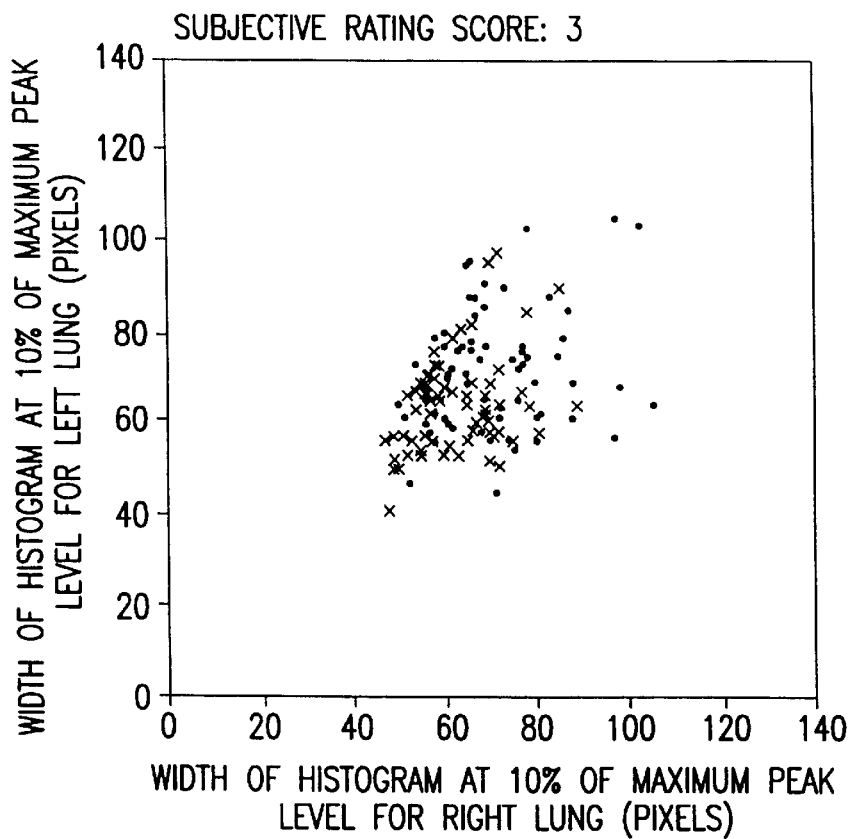
Figure 9D:
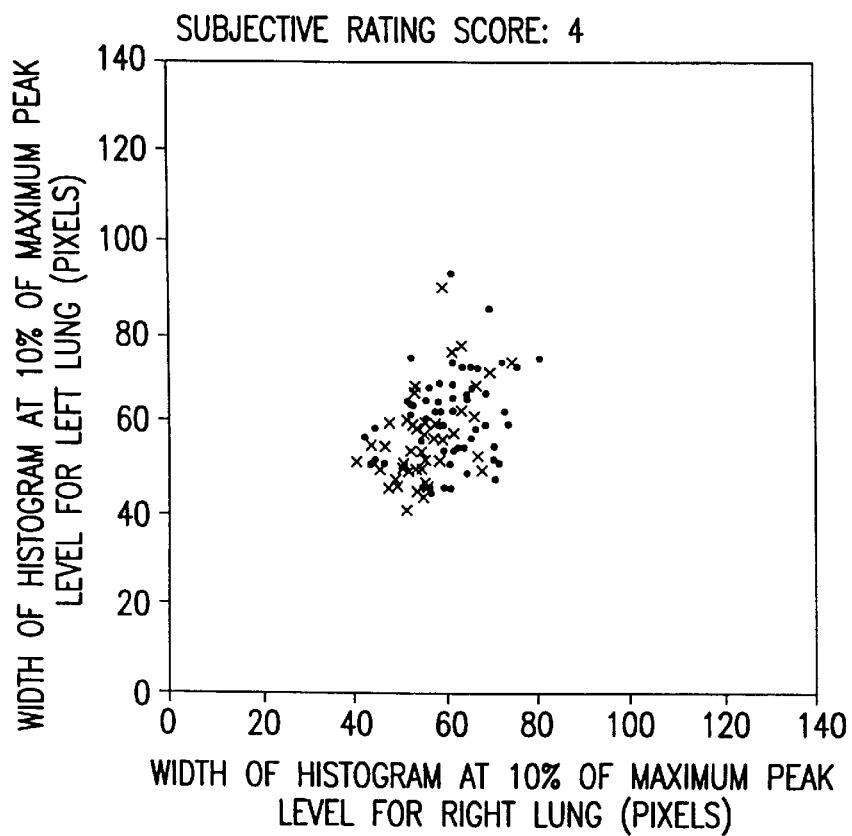
Figure 9E:
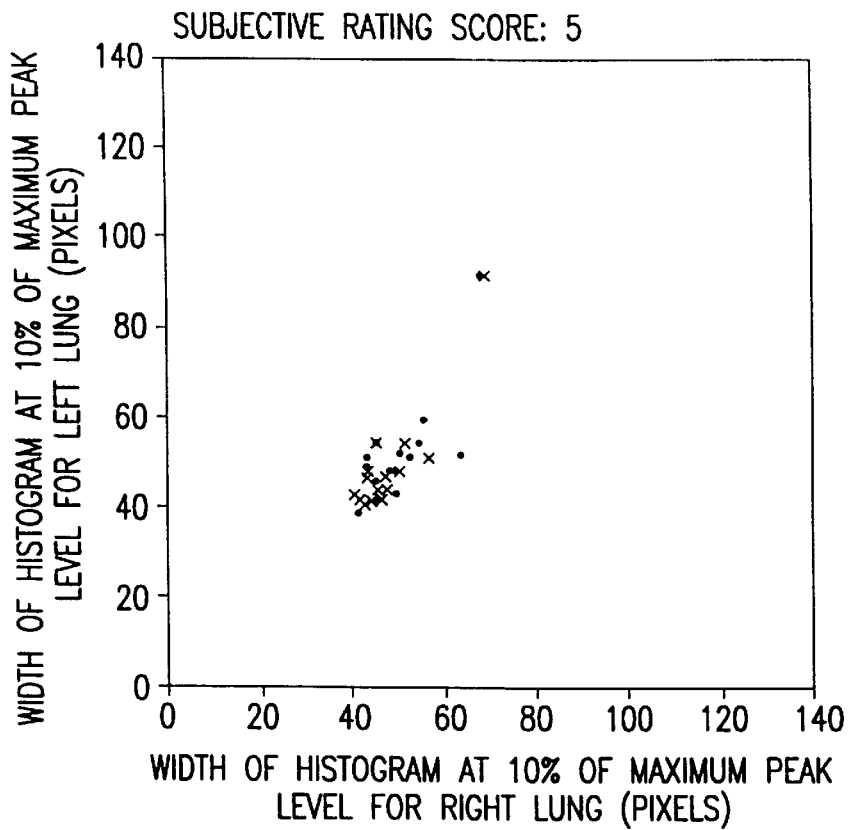

FIGS. 5(a) and 5(b) illustrate the distributions of shift vectors obtained with a good and a poor subtraction image, respectively. As shown in FIG. 5(a), the orientations of the shift vectors for good subtraction images tend to be similar. This may be because the rib contrast in this chest image is relatively high, and thus the template ROI which includes a rib edge could easily match the corresponding rib edge in the search area ROI. The orientations of the shift vectors for a poorly registered case were varied because of the low-contrast ribs. The shift-vector orientation histograms of these cases, FIGS. 5(a) and 5(b), for the right and left lungs are shown in FIGS. 6(a) and 6(b). It is apparent that the shift-vector orientation histograms for a good registered case have a large peak in each lung. However, there is no obvious peak in the orientation histograms for a poor case, as shown in FIG. 6(b).

If a sharp peak exists in the shift-vector orientation histogram, and if the largest peak value is greater than twice the average of accumulated shift values, then the shift vectors within ±90° of the peak angle are considered as the dominant orientation. The remaining vectors outside this angle range are considered as the non-dominant orientation. In that case, subsequently curve fitting of shift values (See U.S. Pat. No. 5,359,513) is performed based only on shift vectors within the ±90° peak angular range, all other shift values being ignored during curve fitting. However, if a dominant orientation does not exist, then the shift vectors in the upper direction (from 0° to 180°) and lower direction (from 180° to 360°) are separately employed for curve fitting of the shift values. In other words, curve fitting of shift values for only those pixels in both lungs having shift vectors in the upper direction (from 0° to 180°) is performed separately of curve fitting of shift values for the remaining pixels of both lungs having shift vectors in the lower direction (from 181° to 360°). FIGS. 7(a) and 7(b) show the selected dominant shift vectors and the corresponding subtraction image obtained by fitting with the dominant shift vectors, respectively. FIGS. 7(c) and 7(d) illustrate non-dominant shift vectors and the corresponding subtraction image obtained by fitting with the non-dominant shift vectors, respectively. It is clear that the subtraction image obtained with the dominant shift vectors is superior to that obtained with the non-dominant shift vectors. FIGS. 8(a) and 8(b) show the temporal subtraction images obtained with the prior technique and that of the present invention using shift-vector analysis, respectively. The quality of the subtraction image obtained according to the present invention is improved slightly.

To determine the efficacy of curve fitting of shift values based on the concepts of dominant and non-dominant shift vectors, as above described, subtraction images were obtained using a warped image in which curve fitting limited to dominant shift vectors was performed for both lungs, and using a warped image in which curve fitting using non-dominant shift vectors was performed. As measure of how image registration between two images, a histogram of pixel values of pixels in the lung regions was derived from each subtraction image. Subtraction images with narrow widths of histograms in the lung regions occur with good image registration since in that case relatively complete subtraction of rib edges, which contribute to wide histograms, occurs. Most of the good subtraction images with narrow pixel histogram widths, i.e, subtraction images derived from images with good registration and in which regions of the lungs have pixel values exhibiting a narrow histogram width, were obtained by use of curve fitting limited to fitting of dominant shift vectors for both lungs. However, in some cases, it is possible that the width of the pixel value histogram in one lung of the subtraction images obtained with the non-dominant shift vectors is narrower than that obtained with the dominant shift vectors because of a rotation error between the current and the previous image. Therefore, when the histogram width of lung pixel values of the subtraction image obtained with the dominant shift vectors is narrower in one lung, but wider in the other lung than the corresponding histogram width obtained with the non-dominant shift vectors, whichever shift values result in smaller pixel value histogram widths of lung pixels for a particular lung are used for a further curve fitting of shift values. In other words, a pair of warped images of one of the digital images, such as the older in time or previous image, are obtained based on fitted dominant and fitted non-dominant shift values. Then a pair of subtraction images is produced between the current or recently obtained image and each of the warped images of the previous image. These subtraction images are then evaluated to determine which of the two warped images results in the better subtraction, i.e., reduced residual permanent structure such as occurs due to ribs, etc. If a single subtraction image exhibits a narrower histogram of pixel values in both lungs, indicating a more uniform texture due to good subtraction of, e.g., ribs, than it is decided that no further improvement in shift values is necessary and the warped image which resulted in the better subtraction is selected for further iterative processing.

If, however, one subtraction image exhibits a narrower histogram of pixel values in one lung and the other subtraction image exhibits a narrower histogram of pixel values in the other lung, i.e., one of said subtraction images does not exhibit narrower histograms of pixel values in both right and left lung regions in comparison to a histograms of pixel values in the respective right and left lung regions of the other subtraction image, the present invention then selects for further two-dimensional fitting the fitted shift values of pixels of each respective lung region in the respective first and second warped images exhibiting the narrower histogram of pixel values, and then performs further two-dimensional fitting on the further selected fitted shift values, and then warps the previous image using said further fitted shift values to produce a warped image for further iterative processing. Thus, the warped previous image is obtained by means of the fitted shift values based on the better subtraction image in each lung. Details of the technique of the invention are discussed further hereinafter in connection with FIGS. 4(e)(1) and 4(e)(2).

6. Iterative Image Warping Technique

According to the present invention, the image warping technique is applied repeatedly and thus iteratively first on the previous image, next on the first warped image, and then on the second warped image, and so on, until the desired quality of the subtraction image is obtained. The second and subsequent image warping steps are employed for improvement of the quality of the temporal subtraction image.

In order to perform the second image warping, the warped previous image from the first warping step is obtained. The current image and the warped previous image are then used for the second image warping. The shift values, $\Delta x$ and $\Delta y$, are determined by use of the cross-correlation technique for all of the selected ROIs in the current image and the warped previous image. As in the first warping step, shift vectors and a histogram of shift vectors are derived, angular ranges determined, and two sets of shift vectors again selected for production of interim first and second twice warped images. Once again, corresponding subtraction images are obtained, and the histograms of pixel values in each subtraction image are evaluated. If one subtraction image exhibits a narrower histogram of pixel values in both lung regions in comparison to that of the other subtraction image, then that subtraction image is considered the final subtraction image for diagnosis (assuming that no further warping iterations are to be performed). If however that is not the case, then another shift value fitting is performed. In that case, the present invention then selects for further two-dimensional fitting the fitted shift values of pixels of each respective lung region in the respective first and second warped images exhibiting the narrower histogram of pixel values, and then performs further two-dimensional fitting on the further selected fitted shift values, and then warps the previously warped image using the further fitted shift values to produce a secondly warped image for further iterative processing, if desired, or for production of the final subtraction image for diagnosis.

The shift values of all x,y coordinates over the entire lung fields for the second image warping are preferably obtained by a linear interpolation technique instead of the surface fitting technique with polynomial functions used during the first warping, since linear interpolation was observed to result in a somewhat better subtraction image after the second image warping. However, the present invention can also be practiced using linear interpolation for the first image warping or polynomial fitting for the second image warping.

FIG. 8(c) shows a subtraction image obtained by application of the second image warping technique. The registration errors for the ribs in the temporal subtraction image are reduced substantially by use of the second image warping technique.

A third image warping technique, which is basically the same as the second warping process, can also be used. The quality of the subtraction image was improved slightly in some cases by applying the third image warping; however, at the expense of increased computational time for the iterative warping process. Thus, to avoid lengthy computational times, two iterations of iterative image warping are preferably employed, i.e., the second image warping technique is employed as a standard for local image matching.

Figures 1, 4E:
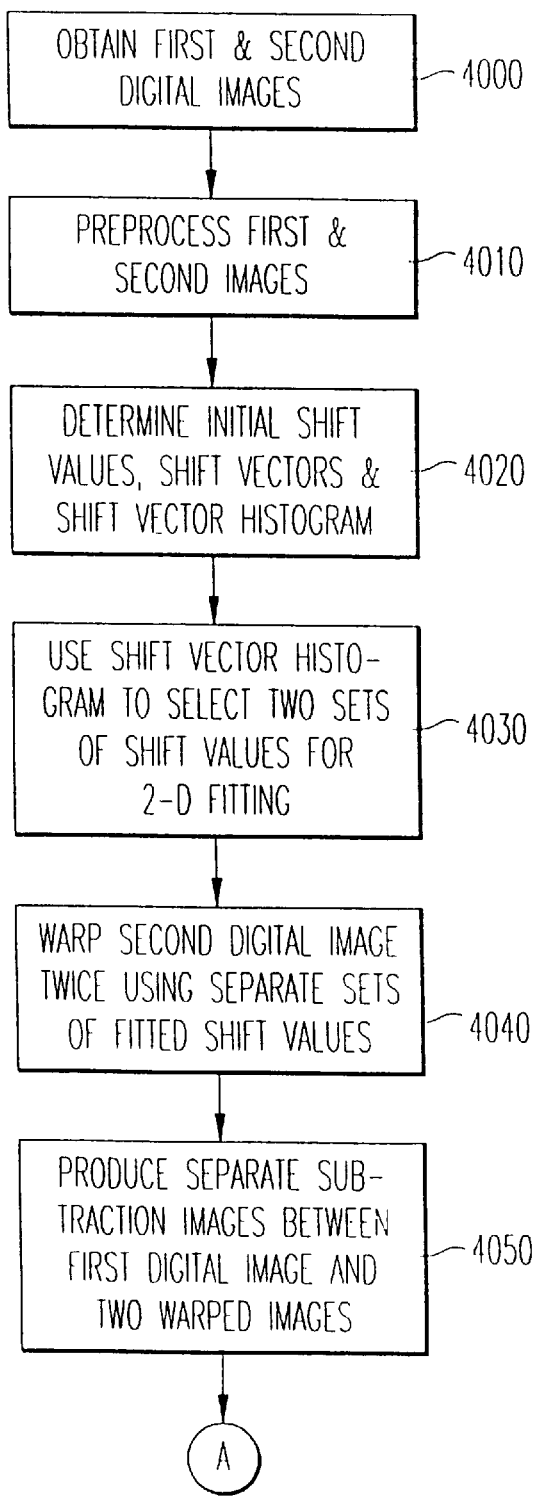
FIGS. 4(e)1 and 4(e)(2) illustrate in more detail than the highly schematic FIGS. 4(a)–4(d) the processing performed in the iterative process of the present invention.
Figures 2, 4E:
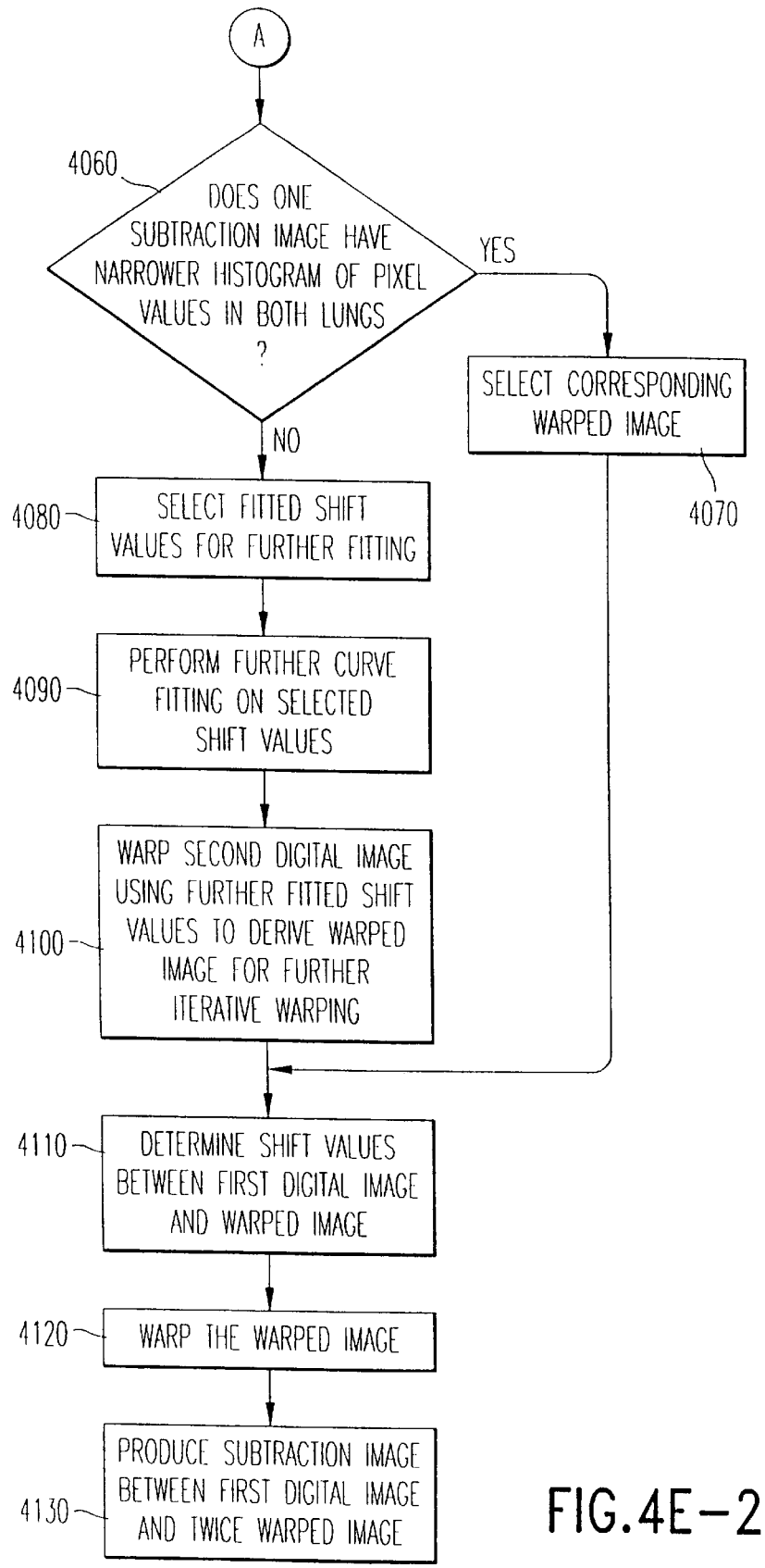

FIGS. 4(e)1 and 4(e)(2) illustrate in more detail than the highly schematic FIGS. 4(a)–4(d) the processing performed in the iterative process of the present invention. The process begins with obtaining first and second temporal sequential digital images of a subject (step 4000). Then these first and second digital images are preprocessed in step 4010, as above discussed in connection with step 420 of FIG. 4(a). In step 4020 initial shift values are determined by selecting plural template regions of interest (ROIs) in the first digital image and corresponding search area ROIs in the second image, and determining shift values between pixels centered in each template ROI and pixels centered in a respective search area ROI and exhibiting highest cross-correlation with respect to said template ROI, [1,3] In step 4020, shift vectors are determined for each of said shift values; a first cumulative histogram of the shift vectors for pixels in one lung, and a second cumulative histogram of the shift vectors for pixels in the other lung are also produced. In step 4030, the shift vector histograms are used to select two sets of shift values for two-dimensional fitting. This may preferably be done based on a detection of peaks in the shift vector histograms of each lung, or in by arbitrarily selecting predetermined angular ranges of shift vectors. If the former approach is implemented, the process includes selecting, based on said first histogram, a first set of pixels in the one lung with shift vectors within a ±90° range of angles of a peak in the first histogram of shift vectors and selecting the second set of pixels as the remaining pixels in the one lung, and selecting, based on the second histogram, a third set of pixels in the other lung with shift vectors within a ±90° range of angles of a peak in the second histogram of shift vectors and selecting the fourth set of pixels as the remaining pixels in the other lung. Then, the shift values of the first and third sets of pixels are fitted using polynomial fitting to produce a first fitted set of shift values, and likewise the shift values of the second and fourth sets of pixels are fitted using polynomial fitting to produce a second fitted set of shift values.

It may occur that a clear peak does not exist in the histogram of shift vectors of one lung. In that case, an arbitrary range of angles may be selected for fitting with dominant and non-dominant shift values of the other lung. For example, in that case, the method may include selecting, based on the first histogram, a first set of pixels in the one lung with shift vectors within a ±90° range of angles of a peak in the first histogram of shift vectors and selecting the second set of pixels as the remaining pixels in the one lung (assuming a peak exists in the histogram of that lung), and selecting, based on the second histogram, a third set of pixels in the other lung with shift vectors within an arbitrary range, e.g., a 0–180° range, of angles in the second histogram of shift vectors and selecting the fourth set of pixels as the remaining pixels in the other lung (assuming a peak does not exist in the shift vector histogram for that lung), and then forming first and second sets of fitted shift values as previously noted. If no peak exists in either shift vector histogram, than arbitrary ranges of angles can be selected in the histograms of shift vectors for both lungs and sets of shift values derived from both lungs then derived and fitted.

In step 4040, the first and second sets of fitted shift values derived in step 4030 are used to warp one of the original sequentially temporal images to derive two warped images. The method then proceeds in step 4050 by producing first and second interim subtraction images between the first digital image and the two warped image, respectively. The two interim subtraction images are then used to derive a final first warped image for further iterative processing.

In particular, the method proceeds in step 4060 to determine a histogram of pixel values in lung regions of the first and second subtraction images and to determine if one of the first and second subtraction images exhibits a narrower histogram of pixel values in both lung regions. When one of the subtraction images exhibits narrower histograms of pixel values in both right and left lung regions in comparison to a histograms of pixel values in the respective right and left lung regions of the other subtraction image, in step 4070 the method proceeds by selecting the warped image from which the subtraction image having the narrower histograms was produced for further iterative warping. When one of the subtraction images does not exhibit narrower histograms of pixel values in both right and left lung regions, the method proceeds in step 4080 by selecting for further two-dimensional fitting the fitted shift values of pixels of each respective lung region in the respective first and second warped images exhibiting the narrower histogram of pixel values, performing further two-dimensional fitting in step 4090 on the further selected fitted shift values, and warping, in step 4100, the second digital image using the further fitted shift values to produce a final first warped image for further iterative warping. In step 4110 a further iteration of warping commences between the final first warped image and the other original digital image by determining shift values, shift vectors and shift vector histograms etc. in much the same way as above discussed in connection with above discussed steps 4020–4100, with the exception that linear interpolation two-dimensional fitting is performed rather polynomial two-dimensional fitting as above noted, to derive a final second set of shift values for warping of the final first warped image in step 4120. In this way a second iteration of warping is performed. Once the final second warped image is obtained in step 4120, and assuming that no further warping iterations are necessary, in step 4130 a subtraction image for diagnosis is produced by subtraction of the final second warped image from the non-warped original digital image.

Results

By using the subjective rating method described earlier, the quality of 181 subtraction images obtained independently with the previous temporal subtraction scheme and the iterative subtraction scheme were evaluated. The results of the subjective evaluation in terms of the number of cases in each rating scale are shown in Table 1 for subtraction images obtained with the previous image warping technique and with the new iterative warping technique of the present invention.

TABLE 1

|  | Subjective rating score | | | | |
| --- | --- | --- | --- | --- | --- |
|  | 1 (very poor) | 2 | 3 (adequate) | 4 | 5 (excellent) |
| Prior image warping method | 24 (13.2%) | 15 (8.3%) | 72 (39.8%) | 55 (30.4%) | 15 (8.3%) |
| New iterative image warping technique | 1 (0.6%) | 3 (1.7%) | 14 (7.7%) | 102 (56.4%) | 61 (33.7%) |

The subtraction images scored as 1 or 2 may be considered as poor and inadequate, and would need to be improved for clinical use. The subtraction images scored as 3, 4, or 5 are good subtraction images, which would be adequate for clinical use. The number of adequate subtraction images increased from 78.5% to 97.7% with the new scheme. It is clear thus that the performance of the temporal subtraction was improved substantially by use of the iterative image warping method of the present invention.

On the other hand, the quality of the 181 subtraction images were evaluated by using the histogram widths. The histogram widths for each subjective rating group are shown in FIGS. 9(a)–9(e). The distributions of the histogram widths of the subtraction images obtained with the previous and the new temporal subtraction scheme are plotted with dots and x, respectively. The results show that the histogram widths of the subtraction images obtained with the iterative warping method of the present invention tend to be small and distributed in the lower left on the graphs. This indicates that the misregistration errors in the subtraction images obtained with the new method are smaller than those obtained with the previous method.

Figure 10A:
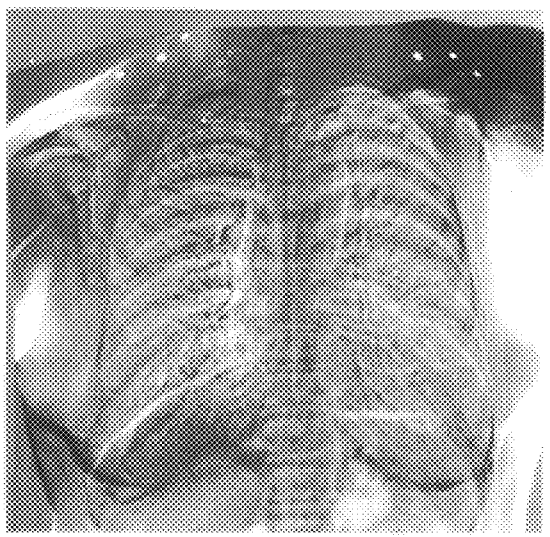
FIGS. 10(a) and 10(b) are photographs of subtraction images for comparison, respectively obtained (a) with the prior warping technique and (b) with the warping technique of the present invention.
Figure 10B:

Subtraction images obtained with the previous and the new method are shown in FIGS. 10(a) and 10(b), respectively. It is apparent that the registration errors in the subtraction image obtained with the previous method are decreased substantially with the new temporal subtraction method, as shown in FIG. 10(b).

In addition, the relative change in the quality of temporal subtraction images was subjectively evaluated by comparing two subtraction images obtained with the previous and the new methods. Using a subjective rating scale from −2 to 2, the quality of the new subtraction image compared to the previous subtraction image is rated as +2, clearly improved;

+2, clearly improved;

+1, moderately improved;

0, unchanged;

−1, moderately declined; and

−2, clearly declined.

Figure 11:
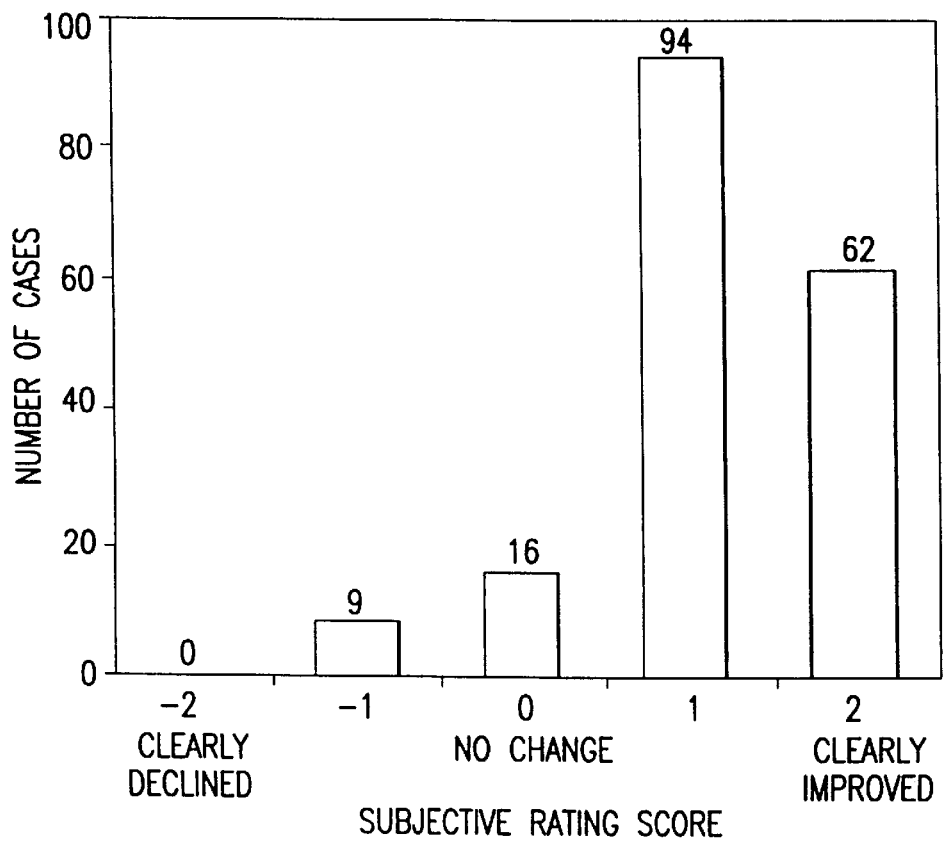
FIG. 11 is a bar graph illustrating the distribution of the degree of improvement, with the subjective rating method, in the quality of the subtraction images obtained with the warping technique of the present invention.

FIG. 11 shows the distribution of the rating scores for all subtraction images. The results show that 156 (86.2%) of the 181 cases were improved by use of the new temporal subtraction method. Thus it is concluded that the new temporal subtraction method based on an iterative warping technique enhances many subtle changes in chest images and results in a substantially improved overall performance of the temporal subtraction.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 12:
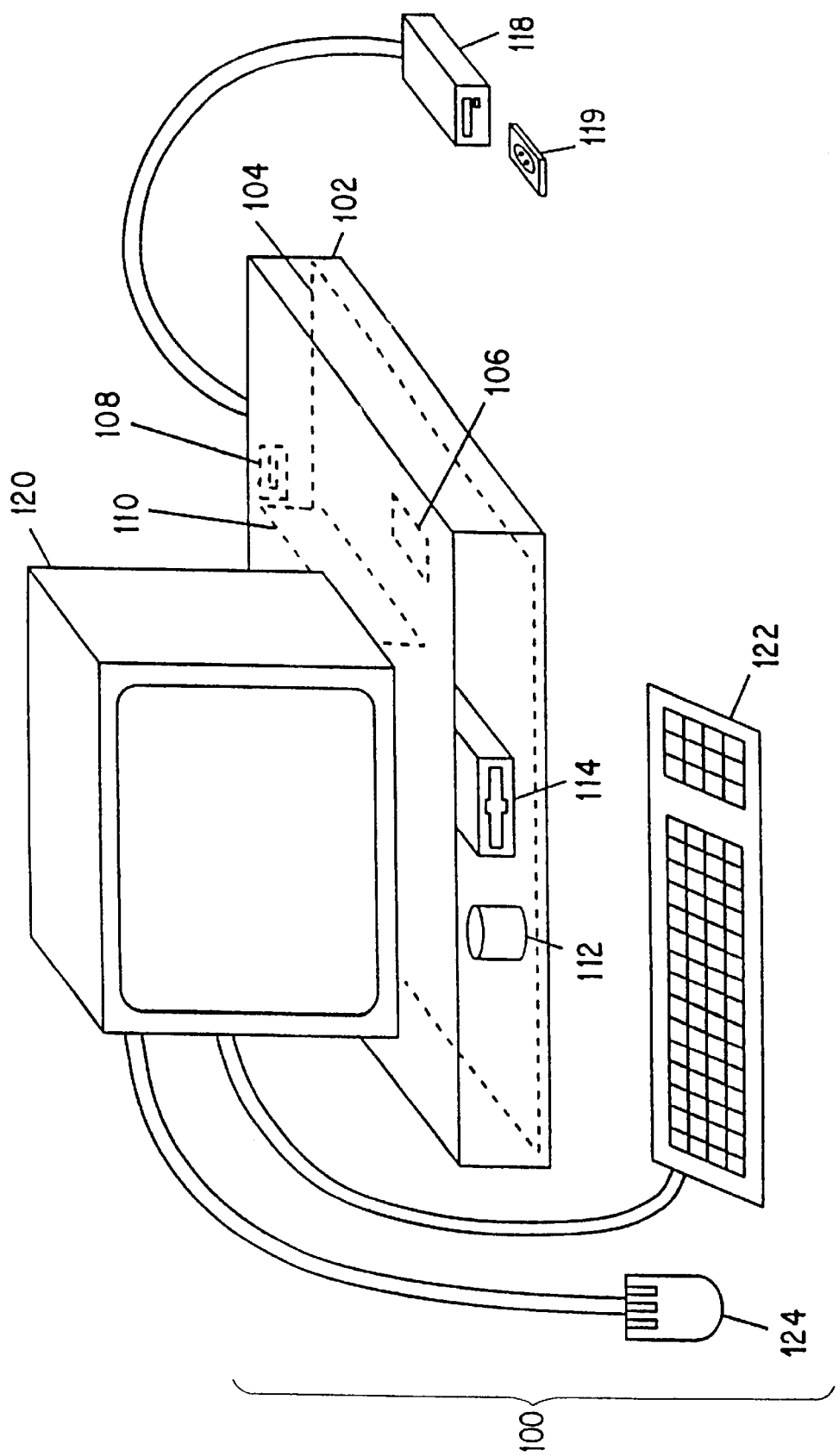
FIG. 12 is a schematic illustration of a general purpose computer 100 programmed according to the teachings of the present invention.

FIG. 12 is a schematic illustration of a general purpose computer 100 programmed according to the teachings of the present invention. The general purpose computer 100 includes a computer housing 102 having a motherboard 104 which contains a CPU 106 and memory 108. The computer 100 also includes plural input devices, e.g., a keyboard 122 and mouse 124, and a display card 110 for controlling monitor 120. In addition, the computer system 100 further includes a floppy disk drive 114 and other removable media devices (e.g., tape, and removable magneto-optical media (not shown)), a hard disk 112, or other fixed, high density media drives, connected using an appropriate device bus, e.g., a SCSI bus or an Enhanced IDE bus. Also connected to the same device bus or another device bus, the computer 100 may additionally include a compact disc reader/writer 118 or a compact disc jukebox (not shown).

Stored on any one of the above described storage media (computer readable media), the present invention includes programming for controlling both the hardware of the computer 100 and for enabling the computer 100 to interact with a human user. Such programming may include, but is not limited to, software for implementation of device drivers, operating systems, and user applications. Such computer readable media further includes programming or software instructions to direct the general purpose computer 100 to perform tasks in accordance with the present invention.

The programming of general purpose computer 100 may include a software module for digitizing and storing PA radiographs obtained from an image acquisition device. Alternatively, it should be understood that the present invention can also be implemented to process digital data derived from a PA radiograph elsewhere.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

APPENDIX

REFERENCES:

1 A. Kano, K. Doi, H. MacMahon, D. D. Hassell, M. L. Giger, "Digital image subtraction of temporally sequential chest images for detection of interval change," Med. Phys. 21: 453–461 (1994). (See U.S. Pat. No. 5,359,513)

2 M. C. Difazio, H. MacMahon, XW Xu, P Tsai, J. Shiraishi, S. G. Armato III, K. Doi, "Digital chest radiography: Effect of temporal subtraction images on detection accuracy," Radiology 202, 447–452 (1977).

3 T. Ishida, K. Ashizawa, R. Engelman, S. Katsuragawa, H. MacMahon, K. Doi, "Application of temporal subtraction for detection of interval change in chest radiographs: Improvement of subtraction images using automated initial image matching," Submitted to Med. Phys. (See U.S. application Ser. No. 08/900,362)

4 H. Takeo, N. Nakajima, M. Ishida, H. Kato, "Improved automatic adjustment of density and contrast in FCR system using neural network," Proc. SPIE, 2163, 98–109 (1994).

5 X. W. Xu, K. Doi, "Image feature analysis for computer-aided diagnosis: Accurate determination of ribcage boundary in chest radiographs," Med. Phys. 22: 617–626, (1995).

6 N. Nakamori, K. Doi, V. Sabeti, H. MacMahon, "Image feature analysis and computer-aided diagnosis in digital radiography: Automated analysis of sizes of heart and lung in digital chest images," Med. Phys. 17, 342–350 (1990).

7 H. Yoshimura, X. W. Xu, K. Doi, H. MacMahon, K. R. Hoffmann, M. L. Giger, S. M. Montner, "Development of a high quality film duplication system using a laser digitizer: Comparison with computed radiography," Med. Phys. 20, 179–186 (1993).

What is claimed as new and desired to be secured by Letters Patent of the United States is:

1. In a method for computerized analysis of temporally sequential digital chest images, each including data corresponding to a pair of lungs, the improvement comprising the steps of:

(a) determining first shift values between pixels of a first digital chest image and corresponding pixels of a second digital chest image, comprising, selecting plural template regions of interest (ROIs) in the first digital chest image and corresponding search area ROIs in the second digital chest image, determining shift values between pixels centered in each template ROI and pixels centered in a respective search area ROI and exhibiting highest cross-correlation with respect to said template ROI, determining shift vectors for each of said shift values, a first cumulative histogram of said shift vectors for pixels in one lung, and a second cumulative histogram of said shift vectors for pixels in the other lung, selecting, based on characteristics of said first and second cumulative histograms of shift vectors, plural of said shift values for derivation of fitted shift values, perfoming two-dimentional fitting on the shift values selected in the preceding step to derive said fitted shift values which serve as said first shift values; and (b) warping said second digital chest image using the first shift values to obtain a warped image in which spatial locations of pixels are varied in relation to said first shift values.

2. The method of claim 1, further comprising the steps of: determining third shift values between pixels of said first digital chest image and pixels of said iteratively warped image; and warping said iteratively warped image based on the third shift values to obtain a further iteratively warped image in which spatial locations of pixels of said iteratively warped image are varied in relation to said third shift values.

3. The method of claim 1, further comprising:

(c) determining second shift values between pixels of said first digital chest image and pixels of said warped image obtained in step (b);

(d) warping said warped image obtained in step (b) based on the second shift values to obtain an iteratively warped image in which spatial locations of pixels of said warped image obtained in step (b) are varied in relation to said second shift values; and (e) subtracting the iteratively warped image from said first digital chest image.

4. The method of claim 2, wherein:

said step of selecting plural shift values comprises, selecting, based on said first histogram, first and second sets of pixels in said one lung with shift vectors within respective first and second predetermined ranges of angles in said first histogram of shift vectors, and selecting, based on said second histogram, third and fourth sets of pixels in said other lung with shift vectors within respective third and fourth predetermined ranges of angles in said second histogram;

said step of performing two-dimensional fitting comprises, performing two-dimensional fitting on the shift values of the first and third sets of pixels to derive a first set of fitted shift values, and performing two-dimensional fitting on the shift values of the second and fourth sets of pixels to derive a second set of fitted shift values; and said step (b) comprises, using said first set of fitted shift values to warp said second digital chest image to obtain a first warped image, using said second set of fitted shift values to warp said second digital chest image to obtain a second warped image, producing first and second subtraction images between said first digital chest image and said first warped image, and between said first digital chest image and said second warped image, respectively, using said subtraction images to derive the warped image for further processing in said steps (c) and (d).

5. The method of claim 4, wherein the step of using said subtraction images to derive the warped image for further processing in said steps (c) and (d) comprises:

determining a histogram of pixel values in lung regions of said first and second subtraction images and determining which of said first and second subtraction images exhibits a narrower histogram of pixel values in each lung region, when one of said subtraction images exhibits narrower histograms of pixel values in both right and left lung regions in comparison to a histograms of pixel values in the respective right and left lung regions of the other subtraction image, selecting the warped image from which the subtraction image having said narrower histograms was produced for further processing in said steps (c), and (d), and when one of said subtraction images does not exhibit narrower histograms of pixel values in both right and left lung regions in comparison to a histograms of pixel values in the respective right and left lung regions of the other subtraction image, selecting for further two-dimensional fitting the fitted shift values of pixels of each respective lung region in the respective first and second warped images exhibiting the narrower histogram of pixel values, performing further two-dimensional fitting on the further selected fitted shift values, and warping said second digital chest image using said further fitted shift values to produce said warped image for further processing in said steps (c) and (d).

6. The method of claim 4, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a ±90° range of angles of a peak in said second histogram of shift vectors and selecting said fourth set of pixels as the remaining pixels in said other lung.

7. The method of claim 6, wherein said step of selecting plural shift values comprises, determining a peak in said first histogram of shift vectors as a shift vector angle having an accumulated shift value greater than twice the average of accumulated shift values of said first histogram.

8. The method of claim 4, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

9. The method of claim 8, wherein said step of selecting plural shift values comprises, determining a peak in said first histogram of shift vectors as a shift vector angle having an accumulated shift value greater than twice the average of accumulated shift values of said first histogram.

10. The method of claim 4, wherein said step of selecting plural shift values comprises, selecting, based on said first histogram, a first set of pixels in said one lung with shift vectors within a 0–180° range of angles in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

11. The method of claim 2, wherein said step (c) comprises:

selecting plural template regions of interest (ROIs) in the first digital chest image and corresponding search area ROIs in the warped image obtained in step (b), determining shift values between pixels centered in each template ROI in said first digital chest image and pixels centered in a respective search area ROI in said warped image obtained in step (b) and exhibiting highest cross-correlation with respect to said template ROI, determining shift vectors for each of said shift values determined in the preceding step, determining a first cumulative histogram of said shift vectors determined in the preceding step for pixels in one lung, and a second cumulative histogram of said shift vectors determined in the preceding step for pixels in the other lung, selecting plural of said shift values for derivation of fitted shift values based on characteristics of said first and second cumulative histograms of shift vectors, and performing two-dimensional fitting on the shift values selected in the preceding step to derive said fitted shift values; and wherein said warped image obtained in said step (d) is obtained using said fitted shift values.

12. The method of claim 11, wherein:

said step of selecting plural shift values comprises, selecting, based on said first histogram, first and second sets of pixels in said one lung with shift vectors within respective first and second predetermined ranges of angles in said first histogram of shift vectors, and selecting, based on said second histogram, third and fourth sets of pixels in said other lung with shift vectors within respective third and fourth predetermined ranges of angles in said second histogram;

said step of performing two-dimensional fitting comprises, performing two-dimensional fitting on the shift values of the first and third sets of pixels to derive a first set of fitted shift values, and performing two-dimensional fitting on the shift values of the second and fourth sets of pixels to derive a second set of fitted shift values; and said step (d) comprises, using said first set of fitted shift values to warp said warped image obtained in said step (b) to obtain a first twice-warped image, using said second set of fitted shift values to warp said warped image obtained in said step (b) to obtain a second twice-warped image, producing first and second subtraction images between said first digital chest image and said first twice-warped image and between said first digital chest image and said second twice-warped image, respectively, using said subtraction images to derive the iteratively warped image for further processing in said step (e).

13. The method of claim 12, wherein the step of using said subtraction images to derive the iteratively warped image for further processing in said step (e) comprises:

determining a histogram of pixel values in lung regions of said first and second subtraction images and determining which of said first and second subtraction images exhibits a narrower histogram of pixel values in each lung region, when one of said subtraction images exhibits narrower histograms of pixel values in both right and left lung regions in comparison to a histograms of pixel values in the respective right and left lung regions of the other subtraction image, selecting the warped image from which the subtraction image having said narrower histograms was produced for further processing in said step (e), and when one of said subtraction images does not exhibit narrower histograms of pixel values in both right and left lung regions in comparison to a histograms of pixel values in the respective right and left lung regions of the other subtraction image, selecting for further two-dimensional fitting the fitted shift values of pixels of each respective lung region in the respective first and second warped images exhibiting the narrower histogram of pixel values, performing further two-dimensional fitting on the further selected fitted shift values to derive said second shift values, and warping said warped image obtained in step (b) using said further fitted shift values serving as said second shift values to produce said iteratively warped image for further processing in said step (e).

14. The method of claim 12, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a ±90° range of angles of a peak in said second histogram of shift vectors and selecting said fourth set of pixels as the remaining pixels in said other lung.

15. The method of claim 14, wherein said step of selecting plural shift values comprises, determining a peak in said first histogram of shift vectors as a shift vector angle having an accumulated shift value greater than twice the average of accumulated shift values of said first histogram.

16. The method of claim 12, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

17. The method of claim 16, wherein said step of selecting plural shift values comprises, determining a peak in said first histogram of shift vectors as a shift vector angle having an accumulated shift value greater than twice the average of accumulated shift values of said first histogram.

18. The method of claim 12, wherein said step of selecting plural shift values comprises, selecting, based on said first histogram, a first set of pixels in said one lung with shift vectors within a 0–180° range of angles in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

19. The method of claim 11, wherein said step of performing two-dimensional fitting on the shift values in said step (c) comprises:

performing linear interpolation of shift values.

20. The method of claim 1, wherein said step of performing two-dimensional fitting on the shift values comprises:

using a two-dimensional nth order polynomial function.

21. A computer readable medium storing computer instructions for computerized analysis of temporally sequential digital chest images, each including data corresponding to a pair of lungs, by performing the steps of:

(a) determining first shift values between pixels of a first digital chest image and corresponding pixels of a second digital chest image, comprising, selecting plural template regions of interest (ROIs) in the first digital chest image and corresponding search area ROIs in the second digital chest image, determining shift values between pixels centered in each template ROI and pixels centered in a respective search area ROI and exhibiting highest cross-correlation with respect to said template ROI, determining shift vectors for each of said shift values, a first cumulative histogram of said shift vectors for pixels in one lung, and a second cumulative histogram of said shift vectors for pixels in the other lung, selecting, based on characteristics of said first and second cumulative histograms of shift vectors, plural of said shift values for derivation of fitted shift, and performing two-dimensional fitting on the shift values selected in the preceding step to derive said first shift values; and (b) warping said second digital chest image using the first shift values to obtain a warped image in which spatial locations of pixels are varied in relation to said first shift values.

22. The computer readable medium of claim 21, further comprising:

(c) determining second shift values between pixels of said first digital chest image and pixels of said warped image obtained in step (b);

(d) warping said warped image obtained in step (b) based on the second shift values to obtain an iteratively warped image in which spatial locations of pixels of said warped image obtained in step (b) are varied in relation to said second shift values; and (e) subtracting the iteratively warped image from said first digital chest image.

23. The computer readable medium of claim 22, further storing computer instructions for performing the steps of:

determining third shift values between pixels of said first digital chest image and pixels of said iteratively warped image; and warping said iteratively warped image based on the third shift values to obtain a further iteratively warped image in which spatial locations of pixels of said iteratively warped image are varied in relation to said third shift values.

24. The computer readable medium of claim 22, wherein: said step of selecting plural shift values comprises, selecting, based on said first histogram, first and second sets of pixels in said one lung with shift vectors within respective first and second predetermined ranges of angles in said first histogram of shift vectors, and selecting, based on said second histogram, third and fourth sets of pixels in said other lung with shift vectors within respective third and fourth predetermined ranges of angles in said second histogram;

said step of performing two-dimensional fitting comprises, performing two-dimensional fitting on the shift values of the first and third sets of pixels to derive a first set of fitted shift values, and performing two-dimensional fitting on the shift values of the second and fourth sets of pixels to derive a second set of fitted shift values; and said step (b) comprises, using said first set of fitted shift values to warp said second digital chest image to obtain a first warped image, using said second set of fitted shift values to warp said second digital chest image to obtain a second warped image, producing first and second subtraction images between said first digital chest image and said first warped image, and between said first digital chest image and said second warped image, respectively, using said subtraction images to derive the warped image for further processing in said steps (c) and (d).

25. The computer readable medium of claim 24, wherein the step of using said subtraction images to derive the warped image for further processing in said steps (c) and (d) comprises:

determining a histogram of pixel values in lung regions of said first and second subtraction images and determining which of said first and second subtraction images exhibits a narrower histogram of pixel values in each lung region, when one of said subtraction images exhibits narrower histograms of pixel values in both right and left lung regions in comparison to a histograms of pixel values in the respective right and left lung regions of the other subtraction image, selecting the warped image from which the subtraction image having said narrower histograms was produced for further processing in said steps (c), and (d), and when one of said subtraction images does not exhibit narrower histograms of pixel values in both right and left lung regions in comparison to a histograms of pixel values in the respective right and left lung regions of the other subtraction image, selecting for further two-dimensional fitting the fitted shift values of pixels of each respective lung region in the respective first and second warped images exhibiting the narrower histogram of pixel values, performing further two-dimensional fitting on the further selected fitted shift values, and warping said second digital chest image using said further fitted shift values to produce said warped image for further processing in said steps (c) and (d).

26. The computer readable medium of claim 24, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a ±90° range of angles of a peak in said second histogram of shift vectors and selecting said fourth set of pixels as the remaining pixels in said other lung.

27. The computer readable medium of claim 26, wherein said step of selecting plural shift values comprises, determining a peak in said first histogram of shift vectors as a shift vector angle having an accumulated shift value greater than twice the average of accumulated shift values of said first histogram.

28. The computer readable medium of claim 24, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

29. The computer readable medium of claim 28, wherein said step of selecting plural shift values comprises, determining a peak in said first histogram of shift vectors as a shift vector angle having an accumulated shift value greater than twice the average of accumulated shift values of said first histogram.

30. The computer readable medium of claim 24, wherein said step of selecting plural shift values comprises, selecting, based on said first histogram, a first set of pixels in said one lung with shift vectors within a 0–180° range of angles in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

31. The computer readable medium of claim 22, wherein said step (c) comprises:

selecting plural template regions of interest (ROIs) in the first digital chest image and corresponding search area ROIs in the warped image obtained in step (b), determining shift values between pixels centered in each template ROI in said first digital chest image and pixels centered in a respective search area ROI in said warped image obtained in step (b) and exhibiting highest cross-correlation with respect to said template ROI, determining shift vectors for each of said shift values determined in the preceding step, determining a first cumulative histogram of said shift vectors determined in the preceding step for pixels in one lung, and a second cumulative histogram of said shift vectors determined in the preceding step for pixels in the other lung, selecting plural of said shift values for derivation of fitted shift values based on characteristics of said first and second cumulative histograms of shift vectors, and performing two-dimensional fitting on the shift values selected in the preceding step to derive said fitted shift values; and wherein said warped image obtained in said step (d) is obtained using said fitted shift values.

32. The computer readable medium of claim 31, wherein:

said step of selecting plural shift values comprises, selecting, based on said first histogram, first and second sets of pixels in said one lung with shift vectors within respective first and second predetermined ranges of angles in said first histogram of shift vectors, and selecting, based on said second histogram, third and fourth sets of pixels in said other lung with shift vectors within respective third and fourth predetermined ranges of angles in said second histogram;

said step of performing two-dimensional fitting comprises, performing two-dimensional fitting on the shift values of the first and third sets of pixels to derive a first set of fitted shift values, and performing two-dimensional fitting on the shift values of the second and fourth sets of pixels to derive a second set of fitted shift values; and said step (d) comprises, using said first set of fitted shift values to warp said warped image obtained in said step (b) to obtain a first twice-warped image, using said second set of fitted shift values to warp said warped image obtained in said step (b) to obtain a second twice-warped image, producing first and second subtraction images between said first digital chest image and said first twice-warped image and between said first digital chest image and said second twice-warped image, respectively, using said subtraction images to derive the iteratively warped image for further processing in said step (e).

33. The computer readable medium of claim 32, wherein the step of using said subtraction images to derive the iteratively warped image for further processing in said step (e) comprises:

determining a histogram of pixel values in lung regions of said first and second subtraction images and determining which of said first and second subtraction images exhibits a narrower histogram of pixel values in each lung region, when one of said subtraction images exhibits narrower histograms of pixel values in both right and left lung regions in comparison to a histograms of pixel values in the respective right and left lung regions of the other subtraction image, selecting the warped image from which the subtraction image having said narrower histograms was produced for further processing in said step (e), and when one of said subtraction images does not exhibit narrower histograms of pixel values in both right and left lung regions in comparison to a histograms of pixel values in the respective right and left lung regions of the other subtraction image, selecting for further two-dimensional fitting the fitted shift values of pixels of each respective lung region in the respective first and second warped images exhibiting the narrower histogram of pixel values, performing further two-dimensional fitting on the further selected fitted shift values to derive said second shift values, and warping said warped image obtained in step (b) using said further fitted shift values serving as said second shift values to produce said iteratively warped image for further processing in said step (e).

34. The computer readable medium of claim 32, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a ±90° range of angles of a peak in said second histogram of shift vectors and selecting said fourth set of pixels as the remaining pixels in said other lung.

35. The computer readable medium of claim 34, wherein said step of selecting plural shift values comprises, determining a peak in said first histogram of shift vectors as a shift vector angle having an accumulated shift value greater than twice the average of accumulated shift values of said first histogram.

36. The computer readable medium of claim 32, wherein said step of selecting plural shift values comprises, selecting, based on said first histogram, a first set of pixels in said one lung with shift vectors within a ±90° range of angles of a peak in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

37. The computer readable medium of claim 36, wherein said step of selecting plural shift values comprises, determining a peak in said first histogram of shift vectors as a shift vector angle having an accumulated shift value greater than twice the average of accumulated shift values of said first histogram.

38. The computer readable medium of claim 32, wherein said step of selecting plural shift values comprises, selecting, based on said first histogram, a first set of pixels in said one lung with shift vectors within a 0–180° range of angles in said first histogram of shift vectors and selecting said second set of pixels as the remaining pixels in said one lung, and selecting, based on said second histogram, a third set of pixels in said other lung with shift vectors within a 0–180° range of angles in said second histogram of shift vectors and selecting said fourth set of pixels as the remaining pixels in said other lung.

39. The computer readable medium of claim 31, wherein said step of performing two-dimensional fitting on the shift values in said step (c) comprises:

performing linear interpolation of shift values.

40. The computer readable medium of claim 21, wherein said step of performing two-dimensional fitting on the shift values comprises:

using a two-dimensional nth order polynomial function.

41. A system for computerized analysis of temporally sequential digital chest images, each including data corresponding to a pair of lungs, the improvement comprising:

(a) means for determining first shift values between pixels of a first digital image and corresponding pixels of a second digital image, comprising, means for selecting plural template regions of interest (ROIs) in the first digital image and corresponding search area ROIs in the second image, means for determining shift values between pixels centered in each template ROI and pixels centered in a respective search area ROI and exhibiting highest cross-correlation with respect to said template ROI, means for determining shift vectors for each of said shift values, a first cumulative histogram of said shift vectors for pixels in one lung, and a second cumulative histogram of said shift vectors for pixels in the other lung, means for selecting, based on characteristics of said first and second cumulative histograms of shift vectors, plural of said shift values for derivation of fitted shift values to serve as said first shift values, and means for performing two-dimensional fitting on the shift values selected in the preceding step to derive said first shift values; and (b) means for warping said second digital image based on the first shift values to obtain a warped image in which spatial locations of pixels are varied in relation to said first shift values.

42. The system of claim 41, further comprising:

(c) means for determining second shift values between pixels of said first digital chest image and pixels of said warped image obtained in means (b);

(d) means for warping said warped image obtained in means (b) based on the second shift values to obtain an iteratively warped image in which spatial locations of pixels of said warped image obtained in means (b) are varied in relation to said second shift values; and (e) means for subtracting the iteratively warped image from said first digital chest image.

43. The system of claim 42, further comprising:

means for determining third shift values between pixels of said first digital chest image and pixels of said iteratively warped image; and means for warping said iteratively warped image based on the third shift values to obtain a further iteratively warped image in which spatial locations of pixels of said iteratively warped image are varied in relation to said third shift values.

44. The system of claim 42, wherein:

said means for selecting plural shift values comprises, means for selecting, based on said first histogram, first and second sets of pixels in said one lung with shift vectors within respective first and second predetermined ranges of angles in said first histogram of shift vectors, and selecting, based on said second histogram, third and fourth sets of pixels in said other lung with shift vectors within respective third and fourth predetermined ranges of angles in said second histogram;

said means for performing two-dimensional fitting comprises, means for performing two-dimensional fitting on the shift values of the first and third sets of pixels to derive a first set of fitted shift values, and means for performing two-dimensional fitting on the shift values of the second and fourth sets of pixels to derive a second set of fitted shift values; and said means (b) comprises,
- means for using said first set of fitted shift values to warp said second digital chest image to obtain a first warped image,
- means for using said second set of fitted shift values to warp said second digital chest image to obtain a second warped image,
- means for producing first and second subtraction images between said first digital chest image and said first warped image, and between said first digital chest image and said second warped image, respectively,
- means for using said subtraction images to derive the warped image for further processing in said means (c) and (d).

45. The system of claim 44, wherein the means for using said subtraction images to derive the warped image for further processing in said means (c) and (d) comprises:
- means for determining a histogram of pixel values in lung regions of said first and second subtraction images and determining which of said first and second subtraction images exhibits a narrower histogram of pixel values in each lung region,
- when one of said subtraction images exhibits narrower histograms of pixel values in both right and left lung regions in comparison to a histograms of pixel values in the respective right and left lung regions of the other subtraction image, means for selecting the warped image from which the subtraction image having said narrower histograms was produced for further processing in said means (c), and means (d), and
- when one of said subtraction images does not exhibit narrower histograms of pixel values in both right and left lung regions in comparison to a histograms of pixel values in the respective right and left lung regions of the other subtraction image, means for selecting for further two-dimensional fitting the fitted shift values of pixels of each respective lung region in the respective first and second warped images exhibiting the narrower histogram of pixel values, performing further two-dimensional fitting on the further selected fitted shift values, and warping said second digital chest image using said further fitted shift values to produce said warped image for further processing in said means (c) and means (d).

46. The system of claim 44, wherein said means for selecting plural shift values comprises,
- means for selecting, based on said first histogram, a first set of pixels in said one lung with shift vectors within a ±90° range of angles of a peak in said first histogram of shift vectors and selecting said second set of pixels as the remaining pixels in said one lung, and
- means for selecting, based on said second histogram, a third set of pixels in said other lung with shift vectors within a ±90° range of angles of a peak in said second histogram of shift vectors and selecting said fourth set of pixels as the remaining pixels in said other lung.

47. The system of claim 46, wherein said means for selecting plural shift values comprises,
- means for determining a peak in said first histogram of shift vectors as a shift vector angle having an accumulated shift value greater than twice the average of accumulated shift values of said first histogram.

48. The system of claim 44, wherein said means for selecting plural shift values comprises,
- means for selecting, based on said first histogram, a first set of pixels in said one lung with shift vectors within a ±90° range of angles of a peak in said first histogram of shift vectors and selecting said second set of pixels as the remaining pixels in said one lung, and
- means for selecting, based on said second histogram, a third set of pixels in said other lung with shift vectors within a 0–180° range of angles in said second histogram of shift vectors and selecting said fourth set of pixels as the remaining pixels in said other lung.

49. The system of claim 48, wherein said means for selecting plural shift values comprises,
- means for determining a peak in said first histogram of shift vectors as a shift vector angle having an accumulated shift value greater than twice the average of accumulated shift values of said first histogram.

50. The system of claim 44, wherein said means for selecting plural shift values comprises,
- means for selecting, based on said first histogram, a first set of pixels in said one lung with shift vectors within a 0–180° range of angles in said first histogram of shift vectors and selecting said second set of pixels as the remaining pixels in said one lung, and
- means for selecting, based on said second histogram, a third set of pixels in said other lung with shift vectors within a 0–180° range of angles in said second histogram of shift vectors and selecting said fourth set of pixels as the remaining pixels in said other lung.

51. The system of claim 42, wherein said means (c) comprises:
- means for selecting plural template regions of interest (ROIs) in the first digital chest image and corresponding search area ROIs in the warped image obtained in means (b),
- means for determining shift values between pixels centered in each template ROI in said first digital chest image and pixels centered in a respective search area ROI in said warped image obtained in means (b) and exhibiting highest cross-correlation with respect to said template ROI,
- means for determining shift vectors for each of said shift values determined in the preceding means,
- means for determining a first cumulative histogram of said shift vectors determined in the preceding means for pixels in one lung, and a second cumulative histogram of said shift vectors determined in the preceding means for pixels in the other lung,
- means for selecting plural of said shift values for derivation of fitted shift values based on characteristics of said first and second cumulative histograms of shift vectors, and
- means for performing two-dimensional fitting on the shift values selected in the preceding means to derive said fitted shift values; and
- wherein said warped image obtained in said means (d) is obtained using said fitted shift values.

52. The system of claim 51, wherein:
said means for selecting plural shift values comprises,
- means for selecting, based on said first histogram, first and second sets of pixels in said one lung with shift vectors within respective first and second predetermined ranges of angles in said first histogram of shift vectors, and selecting, based on said second histogram, third and fourth sets of pixels in said other lung with shift vectors within respective third and fourth predetermined ranges of angles in said second histogram;

said means for performing two-dimensional fitting comprises,
  means for performing two-dimensional fitting on the shift values of the first and third sets of pixels to derive a first set of fitted shift values, and
  means for performing two-dimensional fitting on the shift values of the second and fourth sets of pixels to derive a second set of fitted shift values; and
said means (d) comprises,
  means for using said first set of fitted shift values to warp said warped image obtained in said means (b) to obtain a first twice-warped image,
  means for using said second set of fitted shift values to warp said warped image obtained in said means (b) to obtain a second twice-warped image,
  means for producing first and second subtraction images between said first digital chest image and said first twice-warped image and between said first digital chest image and said second twice-warped image, respectively,
  means for using said subtraction images to derive the iteratively warped image for further processing in said means (e).

53. The system of claim 52, wherein the means for using said subtraction images to derive the iteratively warped image for further processing in said means (e) comprises:
  means for determining a histogram of pixel values in lung regions of said first and second subtraction images and determining which of said first and second subtraction images exhibits a narrower histogram of pixel values in each lung region,
  when one of said subtraction images exhibits narrower histograms of pixel values in both right and left lung regions in comparison to a histograms of pixel values in the respective right and left lung regions of the other subtraction image, means for selecting the warped image from which the subtraction image having said narrower histograms was produced for further processing in said means (e), and
  when one of said subtraction images does not exhibit narrower histograms of pixel values in both right and left lung regions in comparison to a histograms of pixel values in the respective right and left lung regions of the other subtraction image, means for selecting for further two-dimensional fitting the fitted shift values of pixels of each respective lung region in the respective first and second warped images exhibiting the narrower histogram of pixel values, means for performing further two-dimensional fitting on the further selected fitted shift values to derive said second shift values, and means for warping said warped image obtained in means (b) using said further fitted shift values serving as said second shift values to produce said iteratively warped image for further processing in said means (e).

54. The system of claim 52, wherein said means for selecting plural shift values comprises,
  means for selecting, based on said first histogram, a first set of pixels in said one lung with shift vectors within a ±90° range of angles of a peak in said first histogram of shift vectors and selecting said second set of pixels as the remaining pixels in said one lung, and
  means for selecting, based on said second histogram, a third set of pixels in said other lung with shift vectors within a ±90° range of angles of a peak in said second histogram of shift vectors and selecting said fourth set of pixels as the remaining pixels in said other lung.

55. The system of claim 54, wherein said means for selecting plural shift values comprises,
  means for determining a peak in said first histogram of shift vectors as a shift vector angle having an accumulated shift value greater than twice the average of accumulated shift values of said first histogram.

56. The system of claim 52, wherein said means for selecting plural shift values comprises,
  means for selecting, based on said first histogram, a first set of pixels in said one lung with shift vectors within a ±90° range of angles of a peak in said first histogram of shift vectors and selecting said second set of pixels as the remaining pixels in said one lung, and
  means for selecting, based on said second histogram, a third set of pixels in said other lung with shift vectors within a 0–180° range of angles in said second histogram of shift vectors and selecting said fourth set of pixels as the remaining pixels in said other lung.

57. The system of claim 56, wherein said means for selecting plural shift values comprises,
  means for determining a peak in said first histogram of shift vectors as a shift vector angle having an accumulated shift value greater than twice the average of accumulated shift values of said first histogram.

58. The system of claim 52, wherein said means for selecting plural shift values comprises,
  means for selecting, based on said first histogram, a first set of pixels in said one lung with shift vectors within a 0–180° range of angles in said first histogram of shift vectors and selecting said second set of pixels as the remaining pixels in said one lung, and
  means for selecting, based on said second histogram, a third set of pixels in said other lung with shift vectors within a 0–180° range of angles in said second histogram of shift vectors and selecting said fourth set of pixels as the remaining pixels in said other lung.

59. The system of claim 51, wherein said means for performing two-dimensional fitting on the shift values of said means (c) comprises:
  means for performing linear interpolation of shift values.

60. The system of claim 41, wherein said means for performing two-dimensional fitting on the shift values comprises:
  means for using a two-dimensional nth order polynomial function.

* * * * *